US008462985B2

(12) United States Patent
Fujibayashi et al.

(10) Patent No.: US 8,462,985 B2
(45) Date of Patent: Jun. 11, 2013

(54) VIDEO EVALUATION APPARATUS, SPATIO-TEMPORAL FREQUENCY ANALYZING APPARATUS, VIDEO EVALUATION METHOD, SPATIO-TEMPORAL FREQUENCY ANALYZING METHOD, VIDEO EVALUATION PROGRAM, AND SPATIO-TEMPORAL FREQUENCY ANALYZING PROGRAM

(75) Inventors: Akira Fujibayashi, Yokosuka (JP);
Choong Seng Boon, Yokohama (JP);
Sadaatsu Kato, Yokosuka (JP);
Tsutomu Horikoshi, Kamakura (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 13/246,103

(22) Filed: Sep. 27, 2011

(65) Prior Publication Data
US 2012/0020574 A1     Jan. 26, 2012

Related U.S. Application Data

(62) Division of application No. 11/476,026, filed on Jun. 28, 2006, now Pat. No. 8,064,638.

(30) Foreign Application Priority Data

Jun. 29, 2005  (JP) ................. 2005-190443
Apr. 17, 2006  (JP) ................. 2006-113827

(51) Int. Cl.
    *G06K 9/00*    (2006.01)
    *H04B 1/00*    (2006.01)
(52) U.S. Cl.
    USPC .......................... 382/100; 375/130

(58) Field of Classification Search
    USPC ................. 382/104, 106, 112; 375/130–153
    See application file for complete search history.

(56) References Cited

U.S. PATENT DOCUMENTS 5,034,986 A      7/1991 Karmann et al.
7,705,881 B2 *   4/2010 Okamoto et al. ............ 348/180

(Continued)

FOREIGN PATENT DOCUMENTS

JP    7-154769      6/1995
JP    11-215523     8/1999

(Continued)

OTHER PUBLICATIONS

Tatsuto Takeuchi, et al., "Sharpening image motion based on the spatio-temporal characteristics of human vision", Human Vision and Electronic Imaging X, vol. 5666, Mar. 18, 2005, ISBN/ISSN: 0-8194-5639-X, pp. 83-94.

(Continued)

*Primary Examiner* — Alex Liew
(74) *Attorney, Agent, or Firm* — Oblon, Spivak, McClelland, Maier & Neustadt, L.L.P.

(57) ABSTRACT

A video evaluation apparatus and video evaluation method capable of appropriately evaluating a video including of a plurality of frame images, using an objective standard. A reference characteristic, which is a predetermined spatio-temporal frequency characteristic about a video, is stored, and a video characteristic analyzer calculates a spatio-temporal frequency characteristic of a target video including a plurality of frame images. Then a video evaluation determiner calculates an evaluated value of the target video, based on a relative relation between the calculated spatio-temporal frequency characteristic and the stored reference characteristic.

9 Claims, 17 Drawing Sheets

U.S. PATENT DOCUMENTS

2003/0161406 A1    8/2003   Lee
2003/0219162 A1    11/2003   Sano

FOREIGN PATENT DOCUMENTS

| JP | 11-266469 | 9/1999 |
|----|-----------|--------|
| JP | 2004-228742 | 8/2004 |
| WO | WO 02/089344 A2 | 11/2002 |
| WO | WO 03/005726 A2 | 1/2003 |
| WO | WO 2005/020592 * | 3/2005 |
| WO | WO 2005/055618 A1 | 6/2005 |

OTHER PUBLICATIONS

Office Action issued Dec. 21, 2010 in Japanese Patent Application No. P2006-113827 (with English translation).

* cited by examiner

VIDEO EVALUATION APPARATUS, SPATIO-TEMPORAL FREQUENCY ANALYZING APPARATUS, VIDEO EVALUATION METHOD, SPATIO-TEMPORAL FREQUENCY ANALYZING METHOD, VIDEO EVALUATION PROGRAM, AND SPATIO-TEMPORAL FREQUENCY ANALYZING PROGRAM

CROSS-REFERENCE TO RELATED APPLICATIONS

This application is a divisional of and is based upon and claims the benefit of priority under 35 U.S.C. §120 for U.S. Ser. No. 11/476,026, filed Jun. 28, 2006, the entire contents of which is incorporated herein by reference; U.S. Ser. No. 11/476,026, filed Jun. 28, 2006, also claims the benefit of priority under 35 U.S.C. §119 from Japanese Patent Application Nos. P2006-113827, filed Apr. 17, 2006 and P2005-190443, filed Jun. 29, 2005.

BACKGROUND OF THE INVENTION

1. Field of the Invention

The present invention relates to a video evaluation apparatus, spatio-temporal frequency analyzing apparatus, video evaluation method, spatio-temporal frequency analyzing method, video evaluation program, and spatio-temporal frequency analyzing program for evaluating a video.

2. Related Background of the Invention

A "video" is composed of a sequence of "frames" of single still images. A target of video processing including acquisition, accumulation, transmission, display, coding, decoding, and so on of a video is generally a video in which spatial resolutions of individual frames (hereinafter referred to simply as resolutions) are fixed or gradually varied. The human eyes are able to clearly discriminate the differences of the resolutions of images. Accordingly, the differences of resolutions are often connected directly with evaluation on qualities of images, and images of high resolutions are preferred in general.

The document below describes occurrence of the following visual illusion: even in the case where individual frames are images of a low resolution, when they are displayed as a sequential video of the frames, the video looks to a person viewing it as if it were a clear video with an enhanced resolution of images, and is perceived as smoother motion. This visual illusion is called motion sharpening.

Takeuchi T, Karen K. De Valois, "Sharpening image motion based on spatio-temporal characteristics of human vision," Human Vision and Electronic Imaging X, Mar. 18, 2005; Volume 5666, No. 5666, p 83-94; ISBN/ISSN: 0-8194-5639-X The above document describes that the motion sharpening can arise from the magnitude of motion of a subject in images and from high-frequency components of spatial frequencies. It is also described as to the motion sharpening that when frames of a high resolution are interposed between images composed of low-resolution frames and when they are viewed as a motion picture, the resolution of the low-resolution frames is perceived as being higher than the original resolution. Particularly, where 50% of frames constituting a video are high-resolution frames, the resolution of the video seems the same as that of a motion picture consisting of all high-resolution frames, i.e., the video appears such that the perceived resolution is constantly high.

On the other hand, it is known as to the human visual features that the sensitivity of eyes has characteristics for spatio-temporal frequencies of the video (hereinafter referred to as spatio-temporal frequency characteristics). Namely, there exists a property that the human eyes are more sensitive to specific spatio-temporal frequencies contained in images. It is also known that the sensitivity of eyes as a human visual feature becomes lower with increase in spatio-temporal frequencies of a video viewed. It is thus considered that even with change in spatio-temporal frequencies of the video, the lowered sensitivity of eyes can lead to failure in perceiving the difference.

SUMMARY OF THE INVENTION

Incidentally, the aforementioned document reports the result of the following experiment about the perceived resolution for a video of sequential frames: when spatial frequencies of each frame are lowered (i.e., when the resolution is lowered), what is the amount of the frequencies inputted in the human eyes. However, the document describes nothing about how the quality of the video with the resolution perceived by the human eyes (hereinafter referred to as perceived resolution) is evaluated. In other words, nothing is presented as to how much change in the spatio-temporal frequencies of the video is perceived by the human eyes and produces different results of evaluation of the quality. For these reasons, the technology described in above Document 1 has the problem that the quality of the video consisting of a plurality of frames cannot be appropriately evaluated by an objective standard based on the human visual features.

A method of evaluating the quality of the video can be a method of determining a degradation level from a power spectrum, as in the technology described in Japanese Patent Application Laid-Open No. 11-266469, but this method is unable to perform appropriate evaluation based on the aforementioned motion sharpening.

In order to solve the above problem, an object of the present invention is therefore to provide a video evaluation apparatus, spatio-temporal frequency analyzing apparatus, video evaluation method, spatio-temporal frequency analyzing method, video evaluation program, and spatio-temporal frequency analyzing program capable of appropriately evaluating a video consisting of a plurality of frames, using an objective standard.

In order to solve the above problem, a video evaluation apparatus of the present invention is a video evaluation apparatus comprising: storing means for storing a reference characteristic which is a predetermined spatio-temporal frequency characteristic about a video; video characteristic analyzing means for calculating a spatio-temporal frequency characteristic of a target video consisting of a plurality of images; and video evaluation determining means for calculating an evaluated value of the target video, based on a relative relation between the spatio-temporal frequency characteristic calculated by the video characteristic analyzing means and the reference characteristic stored in the storing means.

A video evaluation method of the present invention is a video evaluation method comprising: a video characteristic analyzing step of calculating a spatio-temporal frequency characteristic of a target video consisting of a plurality of images; and a video evaluation determining step of calculating an evaluated value of the target video, based on a relative relation between the spatio-temporal frequency characteristic calculated in the video characteristic analyzing step and the reference characteristic being a predetermined spatio-temporal frequency characteristic about the video.

This invention enables the apparatus and method to store the reference characteristic being the predetermined spatio-temporal frequency characteristic about the video, to import the target video consisting of the plurality of images, to calculate the spatio-temporal frequency characteristic of the target video, and to determine the evaluated value of the input target video, based on the relative relation between the calculated spatio-temporal frequency characteristic and the reference characteristic. This enables evaluation based on the characteristic of the video consisting of the sequential images and appropriate evaluation of the video, when compared with evaluation of one image in the video. Therefore, even if each of the images in the video has a low evaluation because of a low resolution, the video can have a high evaluation, so as to achieve appropriate evaluation of the video.

The video evaluation apparatus of the present invention is preferably configured as follows: it further comprises frequency component adjusting means for adjusting a predetermined frequency component for N (N: an integer of not less than 1) images between any two images in the target video, based on the evaluated value determined by the video evaluation determining means, and the video evaluation determining means calculates an evaluated value of the N images the signal frequency component of which was adjusted by the frequency component adjusting means.

According to the present invention, the predetermined frequency component is adjusted for the N (N: an integer of not less than 1) images between any two images in the target video, based on the determined evaluated value, and the evaluated value of the N images adjusted in the signal frequency component is calculated. This enables reevaluation of the subset of images adjusted in the frequency component and evaluation of the video at every frequency component from a variety of aspects.

In the video evaluation apparatus of the present invention, preferably, the video characteristic analyzing means is comprised of: spatial frequency calculating means for calculating spatial frequencies of a plurality of images; spatial frequency component organizing means for converting components of the spatial frequencies calculated by the spatial frequency calculating means, into data associated with a predetermined reference; spatio-temporal frequency calculating means for effecting a frequency transformation on a temporal change of at least one spatial frequency component out of the spatial frequency components converted by the spatial frequency component organizing means, to calculate spatio-temporal frequencies; and characteristic calculating means for calculating data capable of describing the spatio-temporal frequency characteristic of the video, using a high-frequency component and a low-frequency component out of the spatio-temporal frequencies calculated by the spatio-temporal frequency calculating means.

According to this invention, the spatial frequencies of the plurality of images are calculated, and the components of the calculated spatial frequencies are converted into the data associated with the predetermined reference characteristic. Then the frequency transformation is effected on the temporal change of at least one spatial frequency component out of the spatial frequency components converted, to calculate the spatio-temporal frequencies, and the data capable of describing the spatio-temporal frequency characteristic of the video is calculated using the high-frequency component and low-frequency component out of the calculated spatio-temporal frequencies. This enables appropriate description of the spatio-temporal frequency characteristic of the video, evaluation based on the characteristic of the video consisting of sequential images, and appropriate evaluation of the video, as compared with the evaluation of one image in the video.

Another video evaluation apparatus of the present invention is a video evaluation apparatus comprising: storing means for storing a reference characteristic which is a predetermined spatio-temporal frequency characteristic about a video; first video characteristic analyzing means for calculating a first video characteristic based on a spatio-temporal frequency characteristic of a target video consisting of a plurality of images; second video characteristic analyzing means for calculating a second video characteristic based on a spatio-temporal frequency characteristic of a frequency-component-restricted video obtained by restricting a subset of frequency components in target images; and video evaluation determining means for calculating an evaluated value of the input target video, based on a relative relation between a change amount of the second video characteristic calculated by the second video characteristic analyzing means, relative to the first video characteristic calculated by the first video characteristic analyzing means, and the reference characteristic stored in the storing means.

Another video evaluation method is a video evaluation method comprising: a first video characteristic analyzing step of calculating a first video characteristic based on a spatio-temporal frequency characteristic of a target video consisting of a plurality of images; a second video characteristic analyzing step of calculating a second video characteristic based on a spatio-temporal frequency characteristic of a frequency-component-restricted video obtained by restricting a subset of frequency components in target images; and a video evaluation determining step of calculating an evaluated value of the input target video, based on a relative relation between a change amount of the second video characteristic relative to the first video characteristic, and a reference characteristic which is a predetermined spatio-temporal frequency characteristic about the video.

This invention enables the apparatus and method to store the reference characteristic being the predetermined spatio-temporal frequency characteristic about the video, to import the target video consisting of the plurality of images, to calculate the first video characteristic based on the spatio-temporal frequency characteristic of the target video, to calculate the second video characteristic based on the spatio-temporal frequency characteristic of the frequency-component-restricted video obtained by restricting the subset of frequency components in the target images, and to calculate the evaluated value of the input target video, based on the relative relation between the change amount of the second video characteristic relative to the first video characteristic, and the reference characteristic.

This enables evaluation of the target video using the frequency-component-restricted video obtained by restricting the subset of frequency components, and permits the apparatus and method to clarify the difference in frequency components in the images resulting from the frequency component restriction of the spatio-temporal frequency characteristic. Therefore, the characteristic of the frequency components of the video to be evaluated can be appropriately evaluated based on the frequency-component-restricted video. For example, where the frequency-component-restricted video is a video in which the frequency components that can be perceived by human vision, are restricted, the evaluation based on the relative relation between the change amount between the frequency-component-restricted video and the target video, and the reference characteristic enables evaluation of the video as to the characteristic of the frequency components that cannot be perceived by human vision.

Preferably, the second video characteristic analyzing means of the video evaluation apparatus of the present invention restricts a subset of frequency components in N (N: an integer of not less than 1) images between any two images in the target video to obtain the frequency-component-restricted video.

This invention permits the apparatus to obtain the frequency-component-restricted video in which the subset of frequency components in the N images are restricted, from the N (N: an integer of not less than 1) images between any two images in the target video. Therefore, it enables evaluation of the target video based on the frequency-component-restricted video thus restricted and enables evaluation taking account of the frequency components of the subset of N images in the target video.

The video evaluation apparatus of the present invention is preferably configured as follows: it further comprises frequency component adjusting means for adjusting the frequency components to be restricted by the second video characteristic analyzing means, based on the evaluated value, and the video evaluation determining means calculates an evaluated value of the N images the signal frequency components of which were adjusted by the frequency component adjusting means. This invention permits the apparatus to adjust the characteristic of the restricted frequency components, based on the evaluated value, and to perform reevaluation based on the characteristic of the adjusted frequency components.

The video evaluation apparatus of the present invention is preferably configured to further comprise frequency component restriction amount adjusting means for changing the any two images for defining the frequency-component-restricted objects by the second video characteristic analyzing means, based on the evaluated value. This invention permits the apparatus to change the any two images for the frequency-component-restricted objects, based on the evaluated value, and to perform reevaluation based on the images after the change of the restricted objects.

In the video evaluation apparatus of the present invention, preferably, the first video characteristic analyzing means is comprised of: spatial frequency calculating means for calculating spatial frequencies of a plurality of images; spatial frequency component organizing means for converting components of the spatial frequencies calculated by the spatial frequency calculating means, into data associated with a predetermined reference; spatio-temporal frequency calculating means for effecting a frequency transformation on a temporal change of at least one spatial frequency component out of the spatial frequency components converted by the spatial frequency component organizing means, to calculate spatio-temporal frequencies; and characteristic calculating means for calculating data capable of describing the spatio-temporal frequency characteristic of the video, using a high-frequency component and a low-frequency component out of the spatio-temporal frequencies calculated by the spatio-temporal frequency calculating means.

According to this invention, the spatial frequencies of the plurality of images are calculated, and the components of the calculated spatial frequencies are converted into the data associated with the predetermined reference characteristic. Then the frequency transformation is effected on the temporal change of at least one spatial frequency component out of the spatial frequency components converted, to calculate the spatio-temporal frequencies, and the data capable of describing the spatio-temporal frequency characteristic of the video is calculated using the high-frequency component and low-frequency component out of the calculated spatio-temporal frequencies. This enables appropriate description of the spatio-temporal frequency characteristic of the video, evaluation based on the characteristic of the video consisting of sequential images, and appropriate evaluation of the video, when compared with the evaluation of one image in the video.

In the video evaluation apparatus of the present invention, preferably, the second video characteristic analyzing means is comprised of: spatial frequency calculating means for calculating spatial frequencies from the frequency-component-restricted video obtained by restricting the subset of frequency components in the target images; spatial frequency component organizing means for converting components of the spatial frequencies calculated by the spatial frequency calculating means, into data associated with a predetermined reference; spatio-temporal frequency calculating means for effecting a frequency transformation on a temporal change of at least one spatial frequency component out of the spatial frequency components converted by the spatial frequency component organizing means, to calculate spatio-temporal frequencies; and characteristic calculating means for calculating data capable of describing the spatio-temporal frequency characteristic of the video, using a high-frequency component and a low-frequency component out of the spatio-temporal frequencies calculated by the spatio-temporal frequency calculating means.

According to this invention, the apparatus calculates the spatial frequencies from the frequency-component-restricted video obtained by restricting the subset of frequency components in the target images, and converts the components of the calculated spatial frequencies into the data associated with the predetermined reference characteristic. Then the apparatus effects the frequency transformation on the temporal change of at least one spatial frequency component out of the spatial frequency components thus converted, to calculate the spatio-temporal frequencies, and is able to calculate the data capable of describing the spatio-temporal frequency characteristic of the video, using the high-frequency component and low-frequency component out of the calculated spatio-temporal frequencies. This enables appropriate description of the spatio-temporal frequency characteristic of the video, evaluation based on the characteristic of the video consisting of sequential images, and appropriate evaluation of the video, as compared with the evaluation of one image in the video.

The above reference characteristic in the video evaluation apparatus of the present invention is preferably a frequency characteristic defined based on a human visual feature. According to this invention, the reference characteristic is the frequency characteristic defined based on the human visual feature, whereby the evaluation can be performed based on the human visual feature.

A spatio-temporal frequency characteristic analyzing apparatus of the present invention is a spatio-temporal frequency characteristic analyzing apparatus comprising: spatial frequency calculating means for calculating spatial frequencies of a plurality of images; spatial frequency component organizing means for converting components of the spatial frequencies calculated by the spatial frequency calculating means, into data associated with a predetermined reference; spatio-temporal frequency calculating means for effecting a frequency transformation on a temporal change of at least one spatial frequency component out of the spatial frequency components converted by the spatial frequency component organizing means, to calculate spatio-temporal frequencies; and frequency characteristic calculating means for calculating frequency characteristic data capable of expressing a spatio-temporal frequency characteristic of a video, using a high-frequency component and a low-frequency component out of the spatio-temporal frequencies calculated by the spatio-temporal frequency calculating means.

According to this invention, the spatial frequencies of the plurality of images are calculated, and the components of the spatial frequencies calculated are converted into the data associated with the predetermined reference characteristic. Then the frequency transformation is effected on the temporal change of at least one spatial frequency component out of the spatial frequency components thus converted, to calculate the spatio-temporal frequencies, and the data capable of describing the spatio-temporal frequency characteristic of the video is calculated using the high-frequency component and low-frequency component out of the calculated spatio-temporal frequencies. This enables appropriate expression of the spatio-temporal frequency characteristic of the video, evaluation based on the characteristic of the video consisting of sequential images, and appropriate evaluation of the video, as compared with the evaluation of one image in the video.

Furthermore, it is also possible to describe the invention as a video evaluation program and a spatio-temporal frequency characteristic analyzing program as exemplified below. These are different only in category or the like and substantially the same invention, with the same action and effect.

A video evaluation program of the present invention is a video evaluation program comprising: a storing module for storing a reference characteristic which is a predetermined spatio-temporal frequency characteristic about a video; a video characteristic analyzing module for calculating a spatio-temporal frequency characteristic of a target video consisting of a plurality of images; and a video evaluation determining module for calculating an evaluated value of the target video, based on a relative relation between the spatio-temporal frequency characteristic calculated by the video characteristic analyzing module and the reference characteristic stored in the storing module.

Another video evaluation program of the present invention is a video evaluation program comprising: a storing module for storing a reference characteristic which is a predetermined spatio-temporal frequency characteristic about a video; a first video characteristic analyzing module for calculating a first video characteristic based on a spatio-temporal frequency characteristic of a target video consisting of a plurality of images; a second video characteristic analyzing module for calculating a second video characteristic based on a spatio-temporal frequency characteristic of a frequency-component-restricted video obtained by restricting a subset of frequency components in target images; and a video evaluation determining module for calculating an evaluated value of the input target video, based on a relative relation between a change amount of the second video characteristic calculated by the second video characteristic analyzing module, relative to the first video characteristic calculated by the first video characteristic analyzing module, and the reference characteristic stored in the storing module.

A spatio-temporal frequency characteristic analyzing program of the present invention is a spatio-temporal frequency characteristic analyzing program comprising: a spatial frequency calculating module for calculating spatial frequencies of a plurality of images; a spatial frequency component organizing module for converting components of the spatial frequencies calculated by the spatial frequency calculating module, into data associated with a predetermined reference; a spatio-temporal frequency calculating module for effecting a frequency transformation on a temporal change of at least one spatial frequency component out of the spatial frequency components converted by the spatial frequency component organizing module, to calculate spatio-temporal frequencies; and a frequency characteristic calculating module for calculating data capable of describing a spatio-temporal frequency characteristic of a video, using at least a high-frequency component and a low-frequency component out of the spatio-temporal frequencies calculated by the spatio-temporal frequency calculating module.

The present invention enables the evaluation based on the characteristic of the video consisting of sequential images and the appropriate evaluation of the video, as compared with the evaluation of one image in the video. Therefore, even in the case where each of the images in the video has a low evaluation because of a low resolution, the video can have a high evaluation, and thus the video can be appropriately evaluated.

The present invention enables the evaluation of the target video using the frequency-component-restricted video obtained by restricting the subset of frequency components, and clarifying the characteristic difference of frequency components in the images based on the restriction of the frequency components in the spatio-temporal frequency characteristic. Therefore, the frequency components of the video to be evaluated can be appropriately evaluated based on the frequency-component-restricted video. For example, where the frequency-component-restricted video is a video in which the frequency components that can be perceived by human vision are restricted, the evaluation based on the relative relation between the change amount between the frequency-component-restricted video and the target video, and the reference characteristic enables the evaluation of the video about the frequency components that cannot be perceived by human vision.

DESCRIPTION OF THE PREFERRED EMBODIMENTS

Each of embodiments of the video evaluation apparatus according to the present invention will be described below based on the drawings. In each of the drawings the same elements will be denoted by the same reference symbols, without redundant description.

First Embodiment

Figure 1:
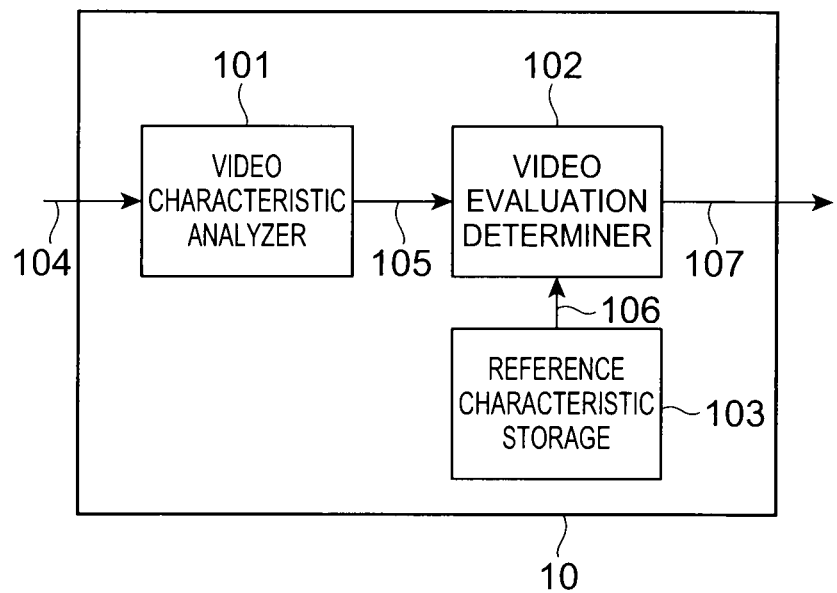
FIG. 1 is a block configuration diagram exemplifying a functional configuration of a video evaluation apparatus in the first embodiment.

First, the first embodiment of the present invention will be described. FIG. 1 is a block configuration diagram exemplifying the functional configuration of video evaluation apparatus 10 in the first embodiment. This video evaluation apparatus 10 is physically a computer equipped with a CPU (central processing unit), storage devices such as memories, and an input/output device (communication device or the like) for importing or exporting a video. For example, the video evaluation apparatus 10 is a fixed communication terminal such as a personal computer, or an information-processable device such as a mobile communication terminal like a cell phone.

The functional configuration of the video evaluation apparatus 10 will be described with reference to FIG. 1. As shown in FIG. 1, the video evaluation apparatus 10 is constructed including a video characteristic analyzer 101 (video characteristic analyzing means), a video evaluation determiner 102 (video evaluation determining means), and a reference characteristic storage 103 (storing means).

The video characteristic analyzer 101 is a part that decomposes an input video signal 104 imported as a motion picture signal from the outside, into frame images and that calculates a feature quantity about a spatio-temporal frequency characteristic of the input video signal, based on the plurality of frame images resulting from the decomposition.

Figure 2:
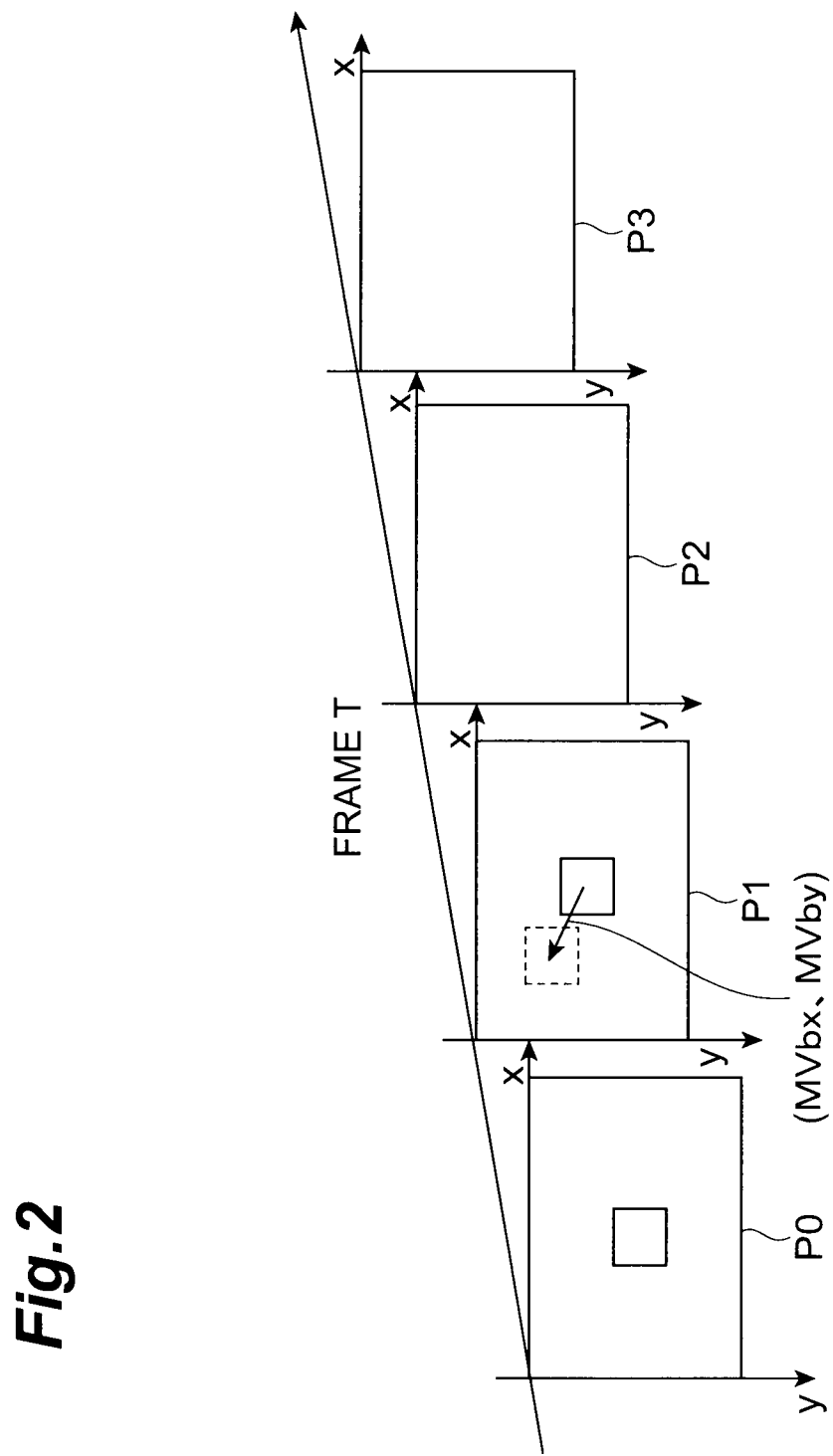
FIG. 2 is a conceptual diagram showing frame images to be read.

A method of calculating the feature quantity about the spatio-temporal frequency characteristic will be specifically described as an analysis for the spatio-temporal frequency characteristic with reference to FIG. 2. FIG. 2 is a conceptual diagram of a video consisting of a plurality of frame images. For convenience of description, four sequential frame images will be described as frame images P0-P3 in an imported order from the outside. The four sequential frame images P0-P3 obtained by the decomposition of the input video signal 104 are sequentially read and stored by the video characteristic analyzer 101. Then the video characteristic analyzer 101 calculates a motion feature quantity in the four frame images P0-P3. The detailed processing up to calculation of the motion feature quantity will be described below.

First, the video characteristic analyzer 101 sequentially reads two sequential frame images. The video characteristic analyzer 101 calculates a motion vector (MVbx, MVby) which is a spatial displacement between the two frame images, based on so-called mutually similar image signal patterns with a coincidence being not less than a predetermined value between the two frame images thus read.

In the present embodiment the video characteristic analyzer 101 divides each frame image into a plurality of blocks of a predetermined size and, for each block of the frame image P1, the analyzer 101 searches the frame image P0 for an image signal pattern closest to an image signal pattern of each block of interest (e.g., one with a coincidence being not less than a predetermined value) by a search process such as block matching. Then the video characteristic analyzer 101 determines a deviation amount indicating how far the locations of the blocks with the matched image signal patterns between the frame images P0 and P1 deviate from each other in the frame image, to calculate a motion vector.

Thereafter, the video characteristic analyzer 101 calculates an average of motion vectors of respective blocks, based on the motion vectors (MVbx, MVby) calculated in all the blocks, to calculate a motion vector Vi (MVxi, MVyi) in the entire frame. The video characteristic analyzer 101 further calculates a motion feature quantity V according to Eq (1) below, using an average of magnitudes of three Vi's between the four frames, and a frame rate f.

$$\text{Motion feature quantity } V = \frac{1}{3}\sum_{i=0}^{3}\sqrt{(MVxi^2 + MVyi^2)} \times \frac{\alpha}{f} \quad (1)$$

In Eq 1 above, i represents a number of each frame. Furthermore, α represents a constant.

In the present embodiment a motion vector was calculated from two sequential frames, but a motion vector may be calculated using two or more frames. It is also possible to use an average, a maximum, or a minimum of motion vectors obtained from a plurality of frames.

The present embodiment exemplified the motion feature quantity using the values calculated from the motion vector Vi in the entire frame, but it is also possible to use a motion feature quantity using the motion vectors (MVbx, MVby) obtained for all the blocks.

It is also possible, for example, to use a maximum, an intermediate value, or a minimum of magnitudes of the motion vectors (MVbx, MVby) obtained for the respective blocks in the frame image, in place of the average of magnitudes of the motion vectors.

In the present embodiment the motion feature quantity was calculated using the magnitudes of the motion vectors in the entire image, but the motion feature quantity may also be calculated using other feature quantities with focus on a motion of image, for example, those indicating a temporal change using a direction of a motion, a distribution of motion vectors of blocks in a frame image, differences of magnitudes of respective motion vectors, differences of directions of respective motion vectors, or a rate of motion vectors with magnitudes not less than a rated value.

The motion feature quantity may also be calculated using phases in a frequency transformation of images. In that case, the discrete Fourier transform or the like is performed for each of all pixels in two frame images to effect a transformation from the pixel space into the frequency space, and identical frequency components in the respective frames are subjected to division, whereby magnitudes of phases of the respective frequency components can be calculated using moving amounts with the magnitudes of the phases. After the calculation of the phases of the respective frequency components, the values of all the phases are summed up to obtain a motion feature quantity. The utilization of phases after the frequency transformation is not limited to this example, but the motion feature quantity may be calculated by any method as long as it can represent a motion quantity between two frames.

Next, the video characteristic analyzer 101 retrieves the frame image P0 saved, and calculates a spatial frequency feature quantity R which is a feature quantity about a spatial frequency characteristic of the frame image P0. Specifically, first, the video characteristic analyzer 101 performs the discrete Fourier transform of all the pixels in the frame image to transform the frame image from the pixel space into the frequency space. In the present embodiment the video characteristic analyzer 101 performs the two-dimensional Fourier transform of the frame image to transform it into a data format having the spatial frequency domain. Then the video characteristic analyzer 101 calculates the spatial frequency feature quantity about the frequency components of the spatial frequencies of the image in the frequency space in accordance with Eq (2).

Here the spatial frequency feature quantity R is a feature quantity indicating a characteristic of the frequency components resulting from the transformation into the frequency space of the image. This spatial frequency feature quantity R is calculated by the video characteristic analyzer 101, using a weighting function (Eq (2)) expressed by the spatial frequencies S constituting the frame image and levels Ps of energies of the respective spatial frequencies S.

$$\text{Spatial frequency feature quantity } R = F_i(P_s, S) = \sum_{j=0}^{S} \beta_j \times P_j \quad (2)$$

In Eq 2 above, i represents a frame number and j a spatial frequency. Furthermore, $\beta_j$ represents a weighting factor for each spatial frequency S.

Figure 3:
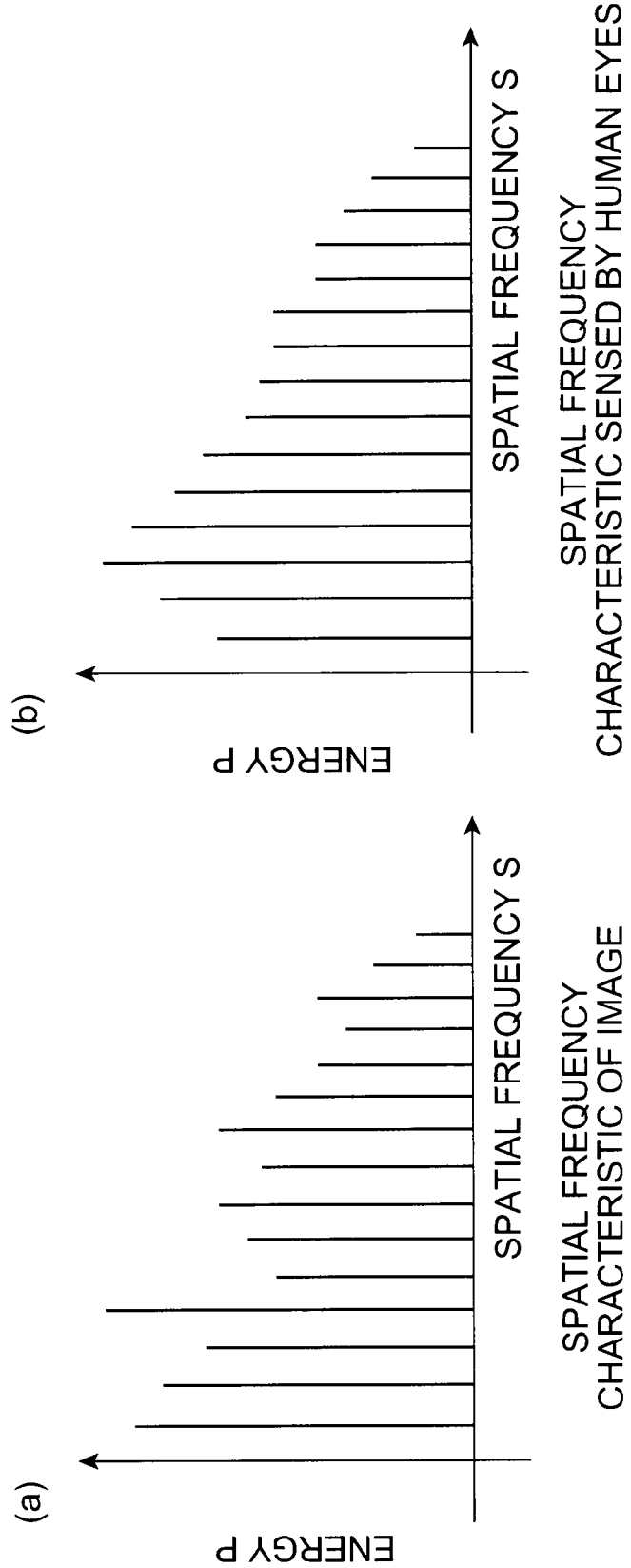
FIG. 3 is an illustration exemplifying relations between a power spectrum in the frequency domain and spatial frequencies.

The spatial frequency characteristic of the image will be described below. FIG. 3 includes explanatory drawings exemplifying spatial frequency characteristics indicating relations between levels P of energies of spatial frequencies in one dimension and spatial frequencies S, in which FIG. 3 (*a*) is an explanatory drawing showing a spatial frequency characteristic of one image and FIG. 3 (*b*) an explanatory drawing showing a spatial frequency characteristic that can be perceived by human eyes. As shown in FIG. 3, the spatial frequency characteristic of the image shows different levels of energies at the respective spatial frequencies, and the spatial frequency characteristic that can be perceived by human eyes also shows different levels of energies at the respective spatial frequencies.

As described above, the video characteristic analyzer 101 calculates the spatial frequency feature quantity R of the frame image P0 and also calculates the spatial frequency feature quantities R of the frame images P1-P3 saved, in the same manner as it.

The spatial frequency feature quantities R are calculated for the respective frames in the present embodiment, but the spatial frequency feature quantity R may be calculated using the spatial frequencies calculated for a plurality of frames. For example, it is also possible to adopt an average of spatial frequencies of plural frames, a weighting operation of plural frames, or the like.

In the present embodiment the apparatus is configured to calculate the spatial frequency feature quantity, based on the weighting function of the spatial frequencies S and the levels Ps of the energies thereof, but the spatial frequency feature quantity may also be calculated, based on another function of any form, as long as the function is one indicating a characteristic of the frequency components of spatial frequencies in the frequency domain of the image.

The present embodiment showed the example of carrying out the discrete Fourier transform with the entire frame image in the calculation of the spatial frequency feature quantity, but it is also possible to adopt a plurality of transformations into the frequency domain, using the one-dimensional discrete Fourier transform in each of directions of the image. Instead of the transformation into the frequency domain, the characteristic of frequency components of spatial frequencies may also be obtained, for example, using calculation of derivative values from the pixel space.

Figure 4:
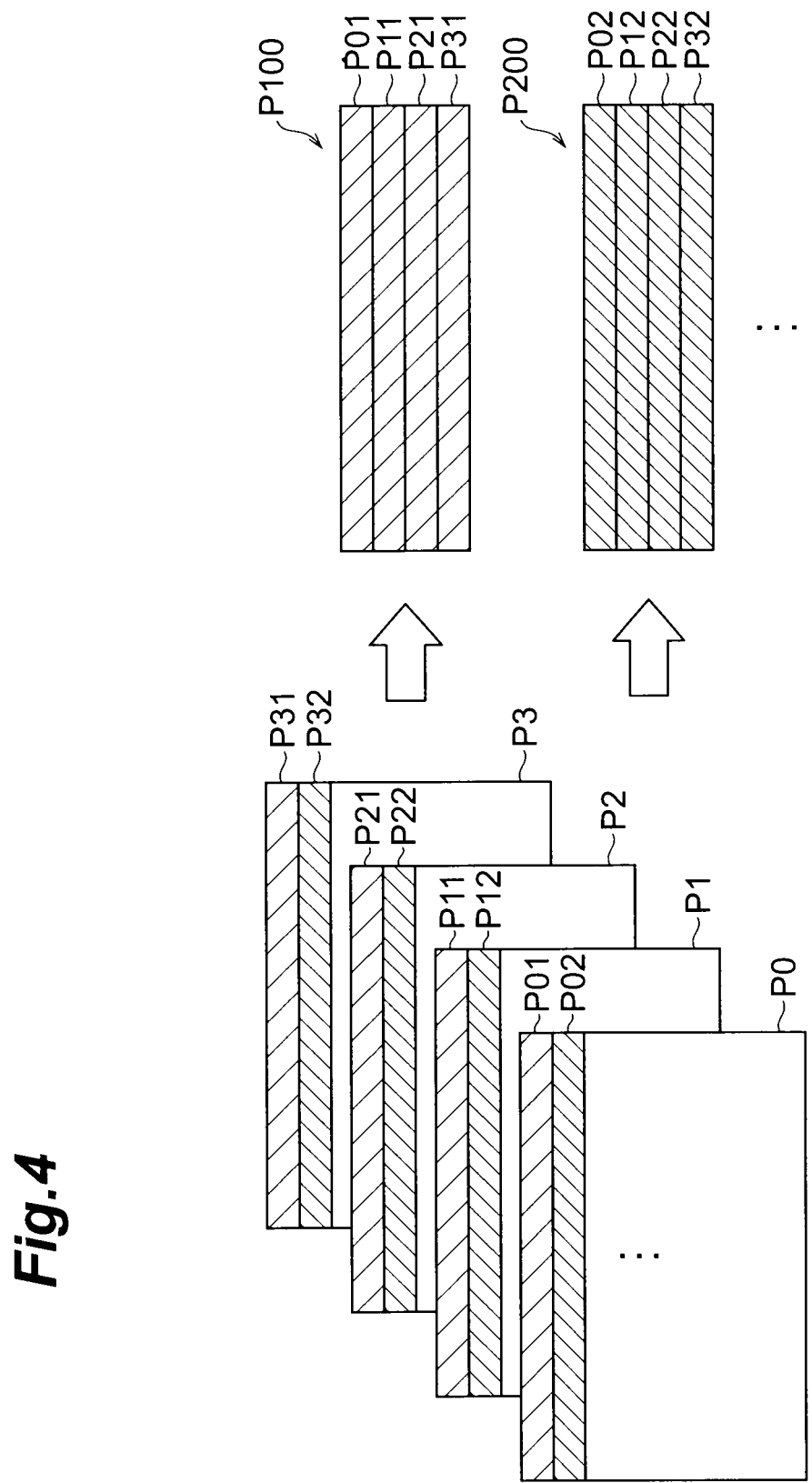
FIG. 4 is a conceptual diagram showing a concept applied when two-dimensional images are extracted in a horizontal direction from frame images P0-P3.

Next, the video characteristic analyzer 101 calculates temporal frequency feature quantities of the frame images P0-P3. Specifically, the video characteristic analyzer 101 extracts a two-dimensional image consisting of image segments in the horizontal direction and in the time-axis direction, which is composed of one column in the horizontal direction×four rows in the time-axis direction. A concept in the extraction of the two-dimensional image will be described below. FIG. 4 is a conceptual diagram showing the concept applied when the two-dimensional image is extracted in the horizontal direction from the frame images P0-P3. As shown in FIG. 4, a horizontal column of image P01 is extracted from the frame image P0. Similarly, a horizontal column of image P11, P21, or P31 is extracted from each of the frame images P1, P2, and P3, to generate a two-dimensional image P100. Next, images P02, P12, P22, and P32 are extracted to generate a two-dimensional image P200. This is repeated in the same manner to generate two-dimensional images sequentially. The video characteristic analyzer 101 effects the two-dimensional discrete Fourier transform on the two-dimensional images thus extracted, to transform the two-dimensional images into the frequency domain.

In this manner the video characteristic analyzer 101 extracts a two-dimensional image consisting of image segments in the horizontal direction and in the time-axis direction similarly from positions shifted by one pixel below in the vertical direction of the spatial directions and transforms it into the frequency domain. The video characteristic analyzer 101 repeatedly carries out this process throughout the entire frame images.

After completion of the process in the vertical direction of the frame images, the video characteristic analyzer 101 calculates an average horizontal frequency component $TFB_h$ of all the extracted two-dimensional image frequency components being the frequency components of all the two-dimensional images extracted, based on Eq (3) below.

$$\text{Average horizontal frequency component } TFB_h = \sum_{m=0}^{Sh} \varphi_m \times P_{hm} \quad (3)$$

Ph represents a level of an energy of a frequency component contained. Furthermore, Sh represents a frequency. $\phi_m$ represents a weighting factor for each frequency component, and the weighting factors are set to values that permit calculation of the average.

Figure 5:
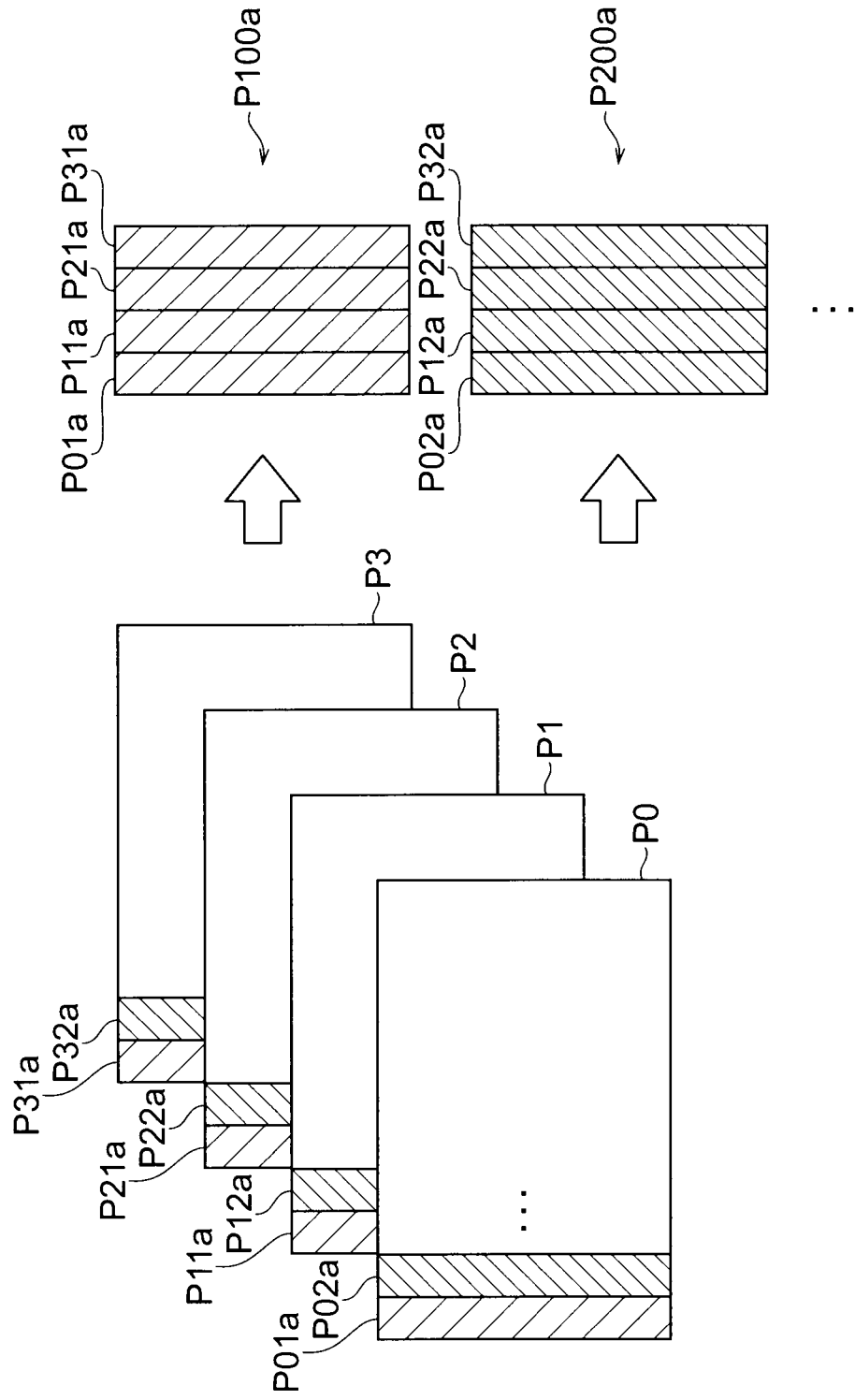
FIG. 5 is a conceptual diagram showing a concept applied when two-dimensional images are extracted in a vertical direction from frame images P0-P3.

Next, the video characteristic analyzer 101 extracts a two-dimensional image consisting of image segments in the vertical direction and in the time-axis direction, which is composed of one row in the vertical direction×four columns in the time-axis direction from the left end of the images. A concept in the extraction of the two-dimensional image will be described below. FIG. 5 is a conceptual diagram showing the concept applied when the two-dimensional image is extracted in the vertical direction from the frame images P0-P3. As shown in FIG. 5, a vertical line of image P01a is extracted from the frame image P0. Similarly, a vertical line of image P11a, P21a, or P31a is extracted from each of the frame images P1, P2, and P3, to generate a two-dimensional image P100a. Next, images P02a, P12a, P22a, and P32a are extracted to generate a two-dimensional image P200a. Two-dimensional images are sequentially generated in the same manner.

The video characteristic analyzer 101 effects the two-dimensional discrete Fourier transform on the two-dimensional images thus extracted, to transform the two-dimensional images into the frequency domain. In this manner, the video characteristic analyzer 101 extracts a two-dimensional image consisting of image segments in the vertical direction and in the time-axis direction similarly from positions shifted by one pixel to the right in the horizontal direction of the spatial directions and transforms it into the frequency domain. The video characteristic analyzer 101 repeatedly carries out this process throughout the entire frame images. After completion of the process in the horizontal direction of the images, the video characteristic analyzer 101 calculates an average vertical frequency component TF13, of all the extracted two-dimensional image frequency components being the frequency components of all the two-dimensional images extracted, according to Eq (4) below.

$$\text{Average vertical frequency component } TFB_v = \sum_{m=0}^{Sv} \mu_m \times P_{vm} \quad (4)$$

Pv represents a level of an energy of a frequency component contained. Furthermore, Sv represents a frequency. $\mu_m$ represents a weighting factor for each frequency component, and the weighting factors are set to values that permit calculation of the average.

Next, the video characteristic analyzer 101 calculates a temporal frequency feature quantity C through calculation of a weighting function of the average horizontal frequency component $TFB_h$ and the average vertical frequency component $TFB_v$ thus calculated. Specifically, the video characteristic analyzer 101 calculates the temporal frequency feature quantity C according to Eq (5) below.

Temporal frequency feature quantity $C=M(TFB_h, TFB_v)=\delta \times TFB_h + \epsilon \times TFB_v$ (5)

In Eq (5) above, $\delta$ and $\epsilon$ are weighting factors.

In the present embodiment the temporal frequency feature quantity was calculated based on the calculation of the weighting function of the average horizontal frequency component $TFB_h$ and the average vertical frequency component $TFB_v$, but the function applied may be a function of any form as long as it is one using the average horizontal frequency component $TFB_h$ and the average vertical frequency component $TFB_v$.

The motion feature quantity V, spatial frequency feature quantities R, and temporal frequency feature quantity C calculated in this manner by the video characteristic analyzer 101, are fed as feature quantities 105 about the spatio-temporal frequency characteristic of the images to the video evaluation determiner 102. This spatio-temporal frequency characteristic is not limited to the feature quantities 105, but can be any parameters capable of describing a characteristic change in the temporal direction expressed by the spatial frequencies of the video in its concept; the spatio-temporal frequency characteristic may be expressed without any one of the motion feature quantity V, the spatial frequency feature quantities R, and the temporal frequency feature quantity C.

In the present embodiment the apparatus is arranged to calculate the averages of all the extracted two-dimensional image frequency components as the average horizontal frequency component $TFB_h$ and the average vertical frequency component $TFB_v$, but it is also possible to calculate averages of only characteristic images in the frequency components of each two-dimensional image. For example, it is also possible to calculate an average in an image a frequency configuration of which among all the extracted two-dimensional image frequency components is not less than a threshold. For example, it is also possible to calculate a weighted average while increasing weights toward the center of the image likely to draw attention.

The present embodiment showed the method of extracting a two-dimensional image consisting of one horizontal column (or one vertical row) in the spatial direction×four temporal rows and effecting the frequency transformation process of the entire image, but the frequency transformation process may also be carried out by any other method: for example, each frame image is divided in block units, blocks are extracted in the temporal direction to generate a two-dimensional image, and the frequency transformation process is effected on the two-dimensional image.

Furthermore, the present embodiment showed the method of repeating the transformation into the two-dimensional frequency domain in the temporal direction, but it is also possible to adopt a transformation into the three-dimensional frequency domain. It is also possible to adopt the one-dimensional Fourier transform in the temporal direction. Instead of the transformation into the frequency domain, it is also possible to obtain a characteristic of frequency components in the temporal direction, for example, using calculation of derivative values from the pixel space.

The present embodiment used the functions about the frequency components in the temporal direction of the images, but it is also possible to express a characteristic, for example, using a function representing a change in the temporal direction, e.g., a function based on a temporal change of correlation values of pixels or a function based on a temporal change of the spatial frequency feature quantity.

The present embodiment was arranged to calculate the feature quantities about the frequency components in the frequency domain by the discrete Fourier transform in the calculation of the spatial frequency feature quantities and in the calculation of the temporal frequency feature quantity, but the method of transformation into the frequency components may be performed using any other method, such as the discrete cosine transform or the discrete wavelet transform.

The number of frames for the calculation of the motion feature quantity or for the temporal frequency feature quantity may be any number as long as the frames are two or more sequential frames.

The present embodiment employed the feature quantities with focus on the motion of the video, the characteristic of spatial frequencies, and the characteristic of spatio-temporal frequencies as the spatio-temporal frequency characteristic of the video, but the spatio-temporal frequency characteristic of the video can be described by any other feature quantities associated with the spatio-temporal frequency characteristic of the video.

The drawings will be further described below. The video evaluation determiner 102 calculates an evaluated value 107 of the video based on the relative relation between the spatio-temporal frequency characteristic of the video and the spatio-temporal frequency characteristic of human eyes on the basis of the feature quantities 105 received from the video characteristic analyzer 101, and feature quantities 106 about the spatio-temporal frequency characteristic of the human visual features as a standard for the relative evaluation stored in the reference characteristic storage 103.

A method of calculating the evaluated value based on the relative relation between the spatio-temporal frequency characteristic of the target video and the human vision characteristic for the video will be specifically described below with reference to FIG. 3. First, the video evaluation determiner 102 calculates differences between the feature quantities 105 about the spatio-temporal frequency characteristic of the video calculated in the video characteristic analyzer 101 and the feature quantities 106 about the spatial frequency characteristic that can be perceived by human eyes (the reference characteristic stored in the reference characteristic storage 103). Then the video evaluation determiner 102 calculates the evaluated value 107 based on the relative relation between the spatio-temporal frequency characteristic and the spatio-temporal frequency characteristic of human eyes according to a predetermined function, based on $\Delta R$ based on the differences between the frequency components of the video and the frequency components that can be perceived by human eyes, the temporal frequency feature quantity C, and the motion feature quantity V. In the present embodiment the video evaluation determiner 102 calculates $\Delta R$ based on the differences between the characteristics of the frequency components of the video and the frequency components that can be perceived by human eyes, according to Eq (6). Then the video evaluation determiner 102 calculates the evaluated value D according to Eq (7).

$$\Delta R = \sum_{i=0}^{4}(F(P_s, S) - H(P_s, S)) \quad (6)$$

In Eq (6), H(Ps,S) represents the feature quantities 106 about the spatio-temporal frequency characteristic that can be perceived by human eyes. In Eq (6), the frame number i ranges from 0 to 3, and this frame number i differs depending upon how to specify the frame images.

$$\text{Evaluated value} D = k(\Delta R, C, V) = \rho \times \frac{(V + C)}{(\omega \times \Delta R) \times C} \quad (7)$$

In Eq (7), $\rho$ and $\omega$ represent weighting factors.

It is noted that H(Ps,S) as the characteristic of frequency components that can be perceived by human eyes does not have to be some fixed feature quantities, but it may be feature quantities 106 about the spatio-temporal frequency characteristic determined by the feature quantities 105.

The characteristic H(Ps,S) of frequency components that can be perceived by human eyes was the characteristic indicating the sensitivity to spatio-temporal frequencies associated with the quality of the video, but it is not limited to this example. For example, it is also possible to adopt any characteristic for a specific quality of the video, such as a characteristic of sensitivity to blur, jerkiness, or flicker of the video. In that case the evaluated value D to be calculated is a value indicating an evaluation for the specific quality of the video.

Furthermore, in the present embodiment the video evaluation determiner 102 calculates the evaluated value D, using $\Delta R$ based on the differences between the feature quantities 105 and the feature quantities 106, but it may be calculated by use of any function based on the comparison between the feature quantities 105 and the feature quantities 106, without need for the differences (e.g., a function indicating a ratio).

The present embodiment used the motion feature quantity V, the difference $\Delta R$ of the spatial frequency feature quantities, and the temporal frequency feature quantity C as the feature quantities 105 to be used in the calculation of the evaluated value D, but the evaluated value D may be calculated without any one of them.

Figure 6:
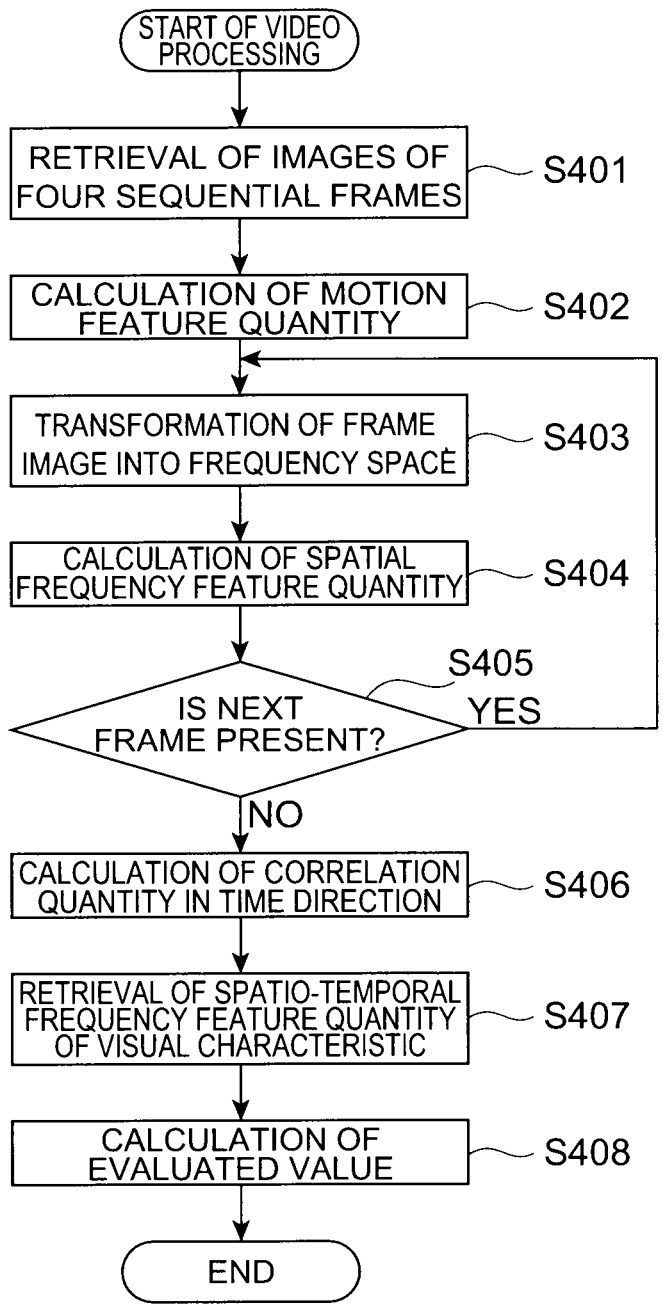
FIG. 6 is a flowchart showing a flow of video evaluation processing in the first embodiment.

Next, a video evaluation process in the video evaluation apparatus 10 of the first embodiment will be described. FIG. 6 is a flowchart showing the video evaluation process of the video evaluation apparatus 10.

First, the video characteristic analyzer 101 sequentially reads and saves four sequential frame images (from frame image P0 to frame image P3) resulting from decomposition of input video signal 104 (step S401).

Next, the video characteristic analyzer 101 calculates motion vectors between the frames as motion feature quantities based on the frame image P0 to frame image P3 and calculates an average of the motion vectors of the frame images P0 to P3. The video characteristic analyzer 101 applies the average of motion vectors and the frame rate f to aforementioned Eq (1) to calculate the motion feature quantity V (step S402).

Next, the video characteristic analyzer 101 effects the frequency transformation on the pixel data of the frame image P0 retrieved, to transform the frame image from the pixel space into the frequency space (step S403). Based on the spatial frequencies obtained by the transformation, the video characteristic analyzer 101 calculates the spatial frequency feature quantity R about the characteristic of frequency components of the spatial frequencies of the frame image P0, according to aforementioned Eq (2) (step S404). The video characteristic analyzer 101 repeats the above processes (S403, S404) for the frame image P1 to frame image P3 (S405).

When the processes are completed for all the frame images P0-P3, the video characteristic analyzer 101 calculates the temporal frequency feature quantity C based on the average horizontal frequency component $TFB_h$ and the average vertical frequency component $TFB_v$ of the frame image P0 to frame image P3 (step S406).

These motion feature quantity V, spatial frequency feature quantities R, and temporal frequency feature quantity C thus calculated are outputted as the feature quantities 105 about the spatio-temporal frequency characteristic of the video to the video evaluation determiner 102.

Then the video evaluation determiner 102 retrieves the feature quantities 106 about the spatio-temporal frequency characteristic as the human vision features stored in the reference characteristic storage 103 (step S407). Then the video evaluation determiner 102 compares the retrieved feature quantities 106 with the feature quantities 105 to calculate the evaluated value 107 (evaluated value D) based on the relative relation between the spatio-temporal frequency characteristic of the input target video and the spatio-temporal frequency characteristic of human eyes (step S408).

As described above, the video evaluation apparatus 10 of the first embodiment is arranged to calculate the feature quantities about the spatio-temporal frequency characteristic of the video and to compare the calculated feature quantities with the feature quantities about the spatio-temporal frequency characteristic of the predetermined standard, whereby it can calculate the evaluated value based on the relative relation between the spatio-temporal frequency characteristic of the input target video and the spatio-temporal frequency characteristic of the predetermined standard. Therefore, the apparatus is able to provide the appropriate evaluated value through the comparison with the spatio-temporal frequency characteristic of the predetermined standard, according to the spatio-temporal frequency characteristic of the input video signal. For example, where the spatio-temporal frequency characteristic of the predetermined standard is the spatio-temporal frequency characteristic of the human visual features, the apparatus is able to appropriately provide the evaluated value based on the relative relation in consideration of effect on human eyes.

Second Embodiment

Figure 7:
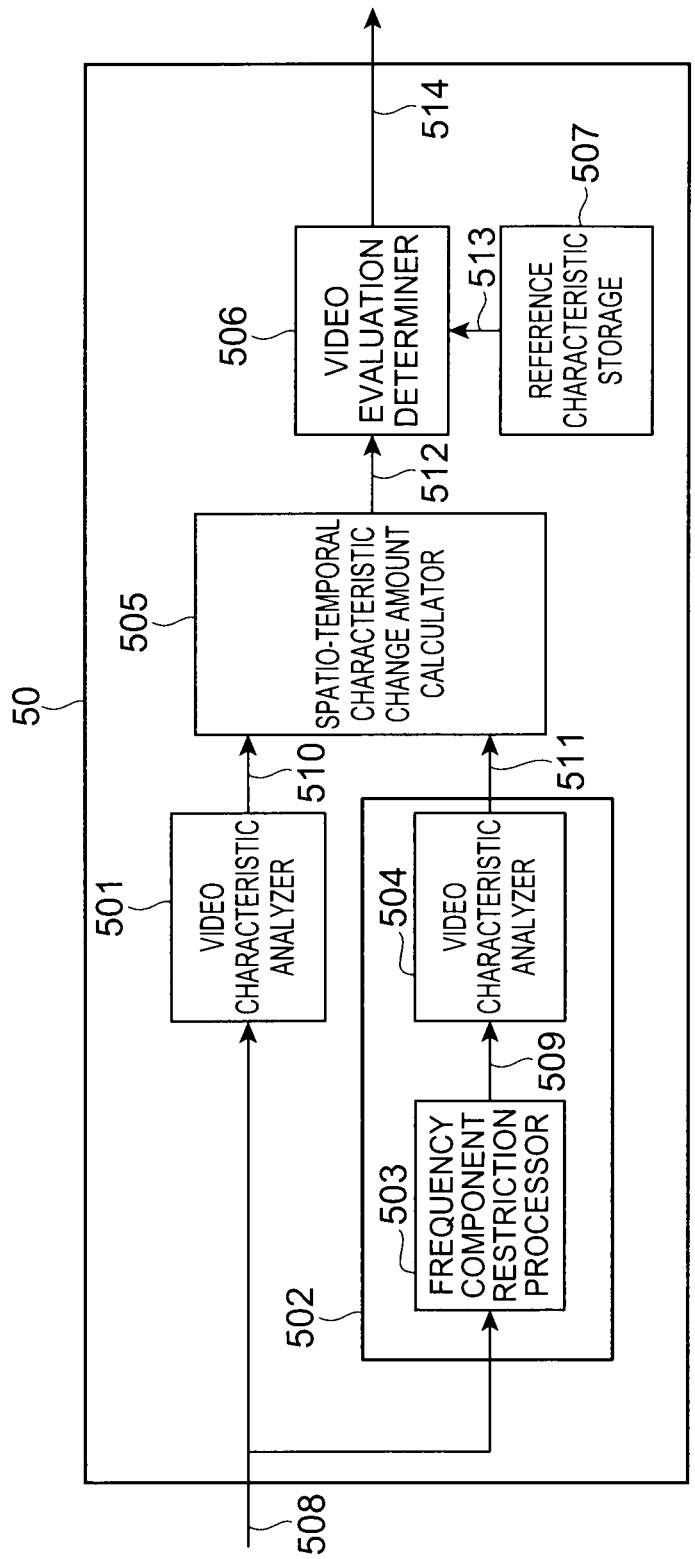
FIG. 7 is a block configuration diagram exemplifying a functional configuration of a video evaluation apparatus in the second embodiment.

Next, the second embodiment of the present invention will be described below. FIG. 7 is a block configuration diagram exemplifying a functional configuration of video evaluation apparatus 50 in the second embodiment. This video evaluation apparatus 50 is physically a computer equipped with a CPU (central processing unit), storage devices such as memories, and an input/output device (communication device or the like) for importing or exporting a video. For example, the video evaluation apparatus 50 is a fixed communication terminal such as a PC terminal, or an information-processable device such as a mobile communication terminal like a cell phone.

Next, the functional configuration of the video evaluation apparatus 50 will be described with reference to FIG. 7. As shown in FIG. 7, the video evaluation apparatus 50 is constructed including a video characteristic analyzer 501 (first video characteristic analyzing means), a frequency-component-restricted video processor 502 (second video characteristic analyzing means), a spatio-temporal characteristic change amount calculator 505, a video evaluation determiner 506 (video evaluation determining means), and a reference characteristic storage 507. The frequency-component-restricted video processor 502 includes a frequency component restriction processor 503 and a video characteristic analyzer 504. Each of the components will be described below.

The video characteristic analyzer 501 is a part that has a function similar to the video characteristic analyzer 101 described above in the first embodiment. Namely, the video characteristic analyzer 501 calculates feature quantities 510 about the spatio-temporal frequency characteristic of images for an input video signal 508 and outputs the calculated feature quantities 510 to the spatio-temporal characteristic change amount calculator 505.

The frequency-component-restricted video processor 502 is a part that effects a frequency component restriction on the input video signal 508 consisting of a plurality of frame images and that outputs feature quantities 511 generated from frequency-component-restricted images resulting from the frequency component restriction, to the spatio-temporal characteristic change amount calculator 505. This frequency-component-restricted video processor 502 includes the frequency component restriction processor 503 and the video characteristic analyzer 504. These components will be described below.

The frequency component restriction processor 503 is a part that performs a process of effecting a frequency component restriction to restrict a subset of signal frequency components, on N (N: an integer of not less than 1) frame images between any two frame images in the input video signal 508 consisting of the plurality of frame images, to create a frequency-component-restricted video 509. This frequency component restriction processor 503 outputs the frequency-component-restricted video 509 thus created, to the video characteristic analyzer 504.

More specifically, the frequency component restriction processor 503 decomposes the input video signal 508 imported as a moving picture signal from the outside, into frame images. Then the frequency component restriction processor 503 specifies two frame images on both sides of N frame images out of the plurality of frame images obtained by the decomposition, and creates a frequency-component-restricted video 509 by restricting at least a subset of frequency components in the N frame images between the predetermined frame images thus specified. The frequency component restriction processor 503 outputs the frequency-component-restricted video 509 thus created, to the video characteristic analyzer 504. The frequency component restriction processor 503 may also be arranged to restrict the frequency components in all the frame images, without specifying the frame images.

The process will be described below using an example of four frame images (e.g., reference is made to FIG. 2). The frequency component restriction processor 503 sequentially reads and saves four sequential frame images resulting from the decomposition of the input video signal 508. The frequency component restriction processor 503 specifies the frame images P0 and P3 and effects a restriction of signal frequency components of frame images on the frame images P1 and P2. Specifically, the frequency component restriction processor 503 retrieves the frame images P1 and P2 and performs the discrete Fourier transform for all the pixels in the frame images to implement a transformation from the pixel space into the frequency space. The frequency component restriction processor 503 stores a plurality of types of frequency component restriction amounts B consisting of restrictions of energy levels (power spectra) and cutoff frequencies in correspondence to respective frequency components of spatial frequencies. Each frequency component restriction amount B includes energy level restriction information to define an upper limit of energy level of frequency for each frequency component, and a cutoff frequency for cutting off high frequencies. Then the frequency component restriction processor 503 determines a frequency component restriction amount B, based on the frequency components of spatial frequencies after the transformation. The frequency component restriction processor 503 processes the frame images P1 and P2 resulting from the transformation into the frequency space, based on the frequency component restriction amount B, to create the frequency-component-restricted video 509.

Figure 8:
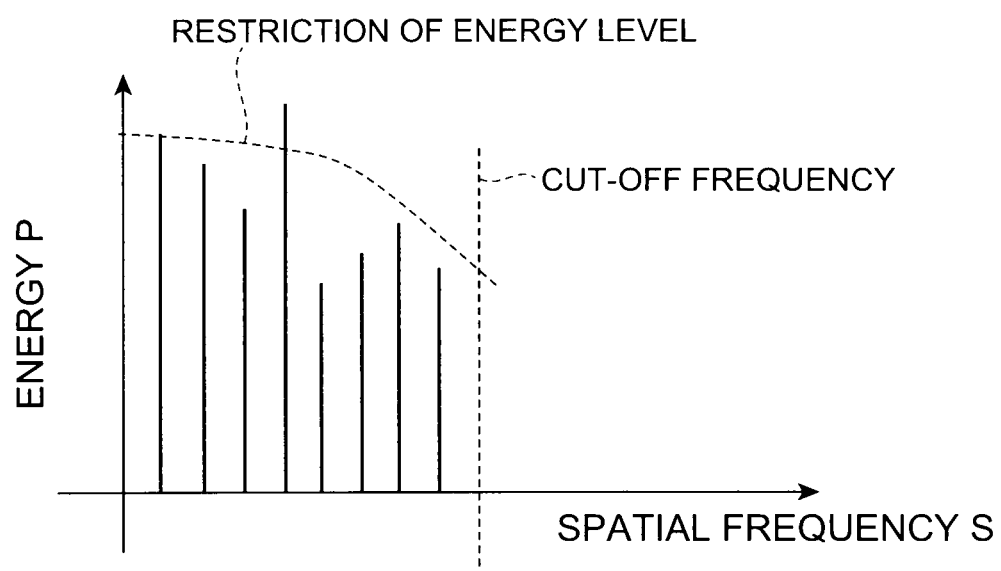
FIG. 8 is an illustration showing a processing example of spatial frequencies.

The frequency component restriction amount B will be described below. FIG. 8 is an explanatory drawing showing a state of restricting the energy level and the cutoff frequency. As shown in FIG. 8, the upper limit of energy level (power spectrum) is defined, and the frequency component restriction processor 503 removes each frequency with an energy over this upper limit. As shown in FIG. 8, the upper limit of frequency (cutoff frequency) is defined in order to remove high frequencies, and the frequency component restriction processor 503 removes frequencies over this upper limit. In this manner, the frequency component restriction processor 503 obtains a frequency space from which the frequencies over the upper limit of energy level and the frequencies over the cutoff frequency are removed, to create the frequency-component-restricted video 509.

In the present embodiment the apparatus was arranged to determine one frequency component restriction amount B out of the plurality of types of frequency component restriction amounts B prepared in advance, based on the frequency components of spatial frequencies of the images, but the frequency component restriction amount B may be determined regardless of the spatial frequencies of the images. Furthermore, one frequency component restriction amount B may be automatically selected or calculated based on the feature quantities of spatial frequencies of the images.

The frequency component restriction processor 503 may have an input/output function to permit input/output to the outside and user's setting of the aforementioned predetermined frequency component restriction amount B and the information about the frames specified (information for specifying arbitrary two frame images).

The present embodiment showed the processing in the frequency domain as means for effecting the frequency component restriction of spatial frequencies, but it is also possible to determine a process using a filter or the like. In addition, the present embodiment exemplified the process of determining the cutoff frequency and removing the high-frequency components from the frequency space, but it is also possible to perform the process on specific frequencies. For example, in the case of the filter, the process for specific frequencies may be performed, using a high-pass filter, a band-pass filter, a band-reject filter, or the like.

Furthermore, in the present embodiment the apparatus was arranged to separately determine the number of frame images N between the two specified frames and the frequency component restriction amount B, but it is also possible to determine the frequency component restriction amount B according to the number of frame images N. In the present embodiment the apparatus was arranged to determine the same frequency component restriction amount B for the frame images P1 and P2, but it is also possible to determine different frequency component restriction amounts B for the respective frames.

Reference is made again to FIG. 7 to further describe the components. The video characteristic analyzer 504 is a part that has a function similar to the video characteristic analyzer 101 described above in the first embodiment. Namely, the video characteristic analyzer 504 is a part that calculates feature quantities 511 about the spatio-temporal frequency characteristic of images in the frequency-component-restricted video 509 and that outputs the feature quantities 511 to the spatio-temporal characteristic change amount calculator 505.

The spatio-temporal characteristic change amount calculator 505 is a part that calculates a change amount 512 of the spatio-temporal frequency characteristic, based on the feature quantities 510 and the feature quantities 511 about the two spatio-temporal frequency characteristics outputted from the video characteristic analyzer 501 and from the video characteristic analyzer 504. Specifically, the spatio-temporal characteristic change amount calculator 505 calculates ΔR based on differences between the spatial frequency feature quantities R (cf. Eq (2)) in the feature quantities 510 about the spatio-temporal frequency characteristic and the spatial frequency feature quantities R (cf. Eq (2)) in the feature quantities 511. In addition, the spatio-temporal characteristic change amount calculator 505 calculates ΔC based on a difference between the temporal frequency feature quantity C (cf. Eq (5)) in the feature quantities 510 and the temporal frequency feature quantity C (cf. Eq (5)) in the feature quantities 511. For example, the spatio-temporal characteristic change amount calculator 505 calculates change amounts 512 based on Eq (8) and Eq (9) below.

$$\Delta R_m = \sum_{i=1}^{2} (|F_{510i}(P_s, S) - F_{511i}(P_s, S)| / F_{510i}(P_s, S)) \quad (8)$$

$$\Delta C = |C_{510} - C_{511}| / C_{510} \quad (9)$$

In Eq (8) and Eq (9), numerals of the subscripts represent the spatial frequency feature quantities R and the temporal frequency feature quantities C of the feature quantities 510 and the feature quantities 511, respectively. In Eq (8) the frame number i ranges from 1 to 2, to calculate the change amount of the frame images P1 and P2, but the frame number i differs depending upon how to specify the arbitrary two frame images.

In the present embodiment the spatio-temporal characteristic change amount calculator 505 was arranged to calculate the change amounts 512, using the functions consisting of the difference of spatial frequency feature quantities R and the difference of temporal frequency feature quantities C in the feature quantities 510 and the feature quantities 511, but the change amount 512 may also be calculated based on the change amount ($\Delta R_m$ or $\Delta C$) of at least one out of the spatial frequency feature quantities R and the temporal frequency feature quantities C. The functions based on Eq (8) and Eq (9) above may be functions for calculating the change amount from a ratio of feature quantities 510 to feature quantities 511 instead of the difference.

The spatio-temporal characteristic change amount calculator 505 outputs the change amounts 512 calculated in this manner, together with the motion feature quantity 510, to the video evaluation determiner 506.

The video evaluation determiner 506 calculates an evaluated value 514 based on the relative relation between the spatio-temporal frequency characteristic of the video and the spatio-temporal frequency characteristic of human eyes on the basis of the motion feature quantity 510 and the change amounts 512 fed from the spatio-temporal characteristic change amount calculator 505 and the feature quantities 513 about the spatio-temporal frequency characteristic of the human visual features as a standard for the relative evaluation stored in the reference characteristic storage 507. This evaluated value 514 may be an evaluation for the entire video, or an evaluation for N frame images between arbitrary two frame images and for the arbitrary two frame images.

Specifically, the video evaluation determiner 506 calculates the evaluated value 514 based on the relative relation between the spatio-temporal frequency differences and the spatio-temporal frequency characteristic of human eyes in accordance with Eq (10) below, on the basis of the feature quantities 513 being the reference characteristic, the change amounts 512 ($\Delta R_m$ based on the difference between the spatial frequency feature quantities and $\Delta C$ based on the difference between the temporal frequency feature quantities), and the motion feature quantity 510. This evaluated value 514 is a value indicating the relative relation between the change amounts of the characteristics of frequency components of the video and the characteristic of the frequency components that can be perceived by human eyes.

$$\text{Evaluated value } E = \quad (10)$$
$$g(\triangle R_m, H(P_s, S), \triangle C, V_{510}) = \rho \times \frac{(V_{510} + \tau/\triangle C)}{\omega \times (\triangle R_m - H(P_s, S)) \times C}$$

In the above equation, $\rho$ and $\omega$ represent weighting factors, and $\tau$ a constant. Furthermore, $H(Ps,S)$ represents the feature quantities 513 about the spatio-temporal frequency characteristic that can be perceived by human eyes, and is stored in the reference characteristic storage 507. $V_{510}$ represents the motion feature quantity of the feature quantities 510 for the input video signal.

$H(Ps,S)$ as the characteristic of the frequency components that can be perceived by human eyes, does not have to be some fixed feature quantities, but may be feature quantities 513 about the spatio-temporal frequency characteristic determined by the feature quantities 510.

The characteristic of the frequency components that can be perceived by human eyes was the characteristic indicating the sensitivity to the spatio-temporal frequencies, but it does not have to be limited to this example. For example, it may be a characteristic about a specific quality of the video, such as a characteristic of spatio-temporal frequencies to blur, jerkiness, or flicker of the video. In that case the evaluated value E is calculated as a value indicating an evaluation for the specific quality of the video.

The present embodiment showed the evaluated value E calculated based on the feature quantities 513 of the reference characteristic, $\Delta R_m$ based on the difference between the spatial frequency feature quantities, $\Delta C$ based on the difference between the temporal frequency feature quantities, and the motion feature quantity 510, but the function to be applied may be any function that can be calculated through the comparison between the change amounts 512 and the feature quantities 513 and based on the relative relation between the change amounts 512 and the feature quantities 513. Such function can present the relative evaluated value to the visual features about how much the human eyes are affected by the frequency component restriction to restrict the subset of signal frequency components in the input video.

The present embodiment used the motion feature quantity V, $\Delta R_m$ based on the difference between spatial frequency feature quantities, and $\Delta C$ based on the difference between temporal frequency feature quantities as the feature quantities 510 used in the calculation of the evaluated value E, but the evaluated value E may be calculated without any one of them.

Figure 9:
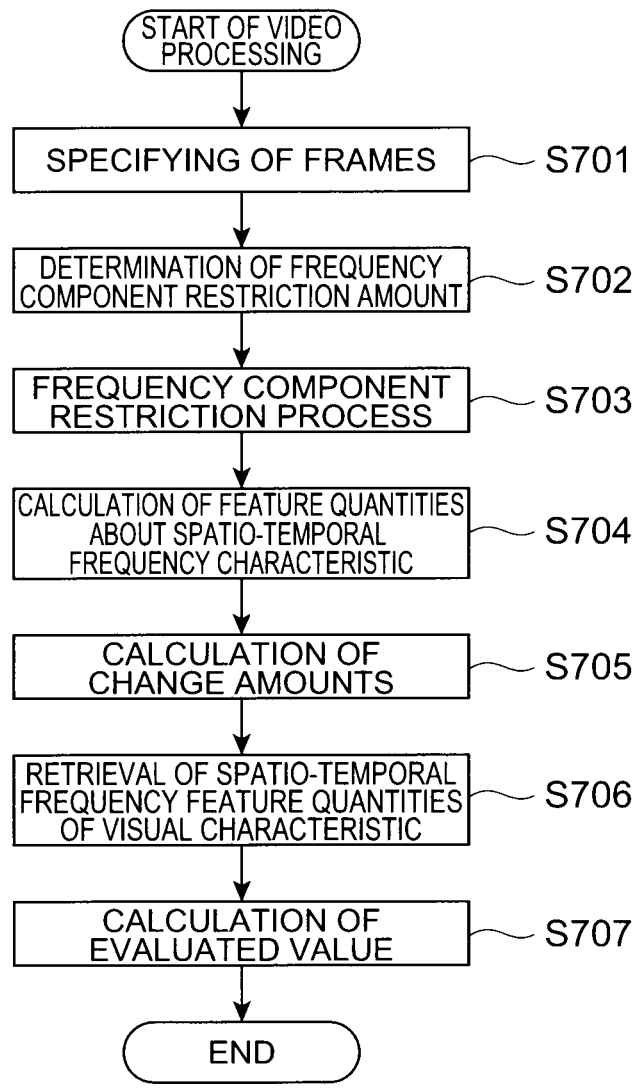
FIG. 9 is a flowchart showing a flow of video processing in the second embodiment.

Next, the video evaluation process in the video evaluation apparatus of the second embodiment will be described. FIG. 9 is a flowchart showing the video evaluation process of the video evaluation apparatus 50.

The video characteristic analyzer 501 calculates the feature quantities 510 about the spatio-temporal frequency characteristic of the video for the input video signal 508.

On the other hand, the frequency component restriction processor 503 specifies two frame images out of a plurality of frame images (step S701). Then the frequency component restriction processor 503 determines the frequency component restriction amount B for the frequency component restriction process on N frame images present between the two frames among the frame images, based on the frequency components of spatial frequencies of frame images transformed (step S702).

Next, the frequency component restriction processor 503 performs the frequency component restriction process for the N frame images so as to remove frequencies determined by the frequency component restriction amount B from the N frame images, to create the frequency-component-restricted video 509 (step S703). Then the video characteristic analyzer 504 calculates the feature quantities 511 about the spatio-temporal frequency characteristic of the video from the frequency-component-restricted video 509 thus created (step S704). Namely, the video characteristic analyzer 504 performs the video evaluation process (cf. FIG. 6) of the steps S401 to S405 described in the aforementioned first embodiment, for each frame image, to calculate the feature quantities 511 about the spatio-temporal frequency characteristic of the frequency-component-restricted video 509. On the other hand, the video characteristic analyzer 501 similarly calculates the motion feature quantities 510 about the spatio-temporal frequency characteristic of the input video signal 508.

Next, the spatio-temporal characteristic change amount calculator 505 calculates the differences between the two feature quantities 510 and 511 outputted from the video characteristic analyzer 501 and from the video characteristic analyzer 504, to calculate the change amounts 512 (step S705). Then the video evaluation determiner 506 retrieves the feature quantities 513 about the spatio-temporal frequency characteristic as the human visual features stored in the reference characteristic storage 507 (step S706). The video evaluation determiner 506 compares the retrieved feature quantities 513 with the change amounts 512 to calculate the evaluated value 514 based on the relative relation between the spatio-temporal frequency characteristic of the input video and the spatio-temporal frequency characteristic of human eyes, and the motion feature quantity 510 (step S707).

As described above, the video evaluation apparatus 50 of the second embodiment is able to create the frequency-component-restricted video 509, which is created by performing the process of restricting the subset of signal frequency components, for some frame images in the input video. Then the apparatus calculates the feature quantities about the spatio-temporal frequency characteristics of the partially frequency-component-restricted video and the input video, and compares the change amounts of the calculated feature quantities with the feature quantities about the spatio-temporal frequency characteristic of the human visual features, to calculate the evaluated value based on the relative relation between the change amounts of the spatio-temporal frequency characteristic according to the frequency component restriction on the input video and the spatio-temporal frequency characteristic of human eyes. Therefore, the apparatus is able to present the relative value taking account of the effect on human eyes, based on the change amounts of the spatio-temporal frequency characteristic according to the frequency component restriction on the input video.

Third Embodiment

Figure 10:
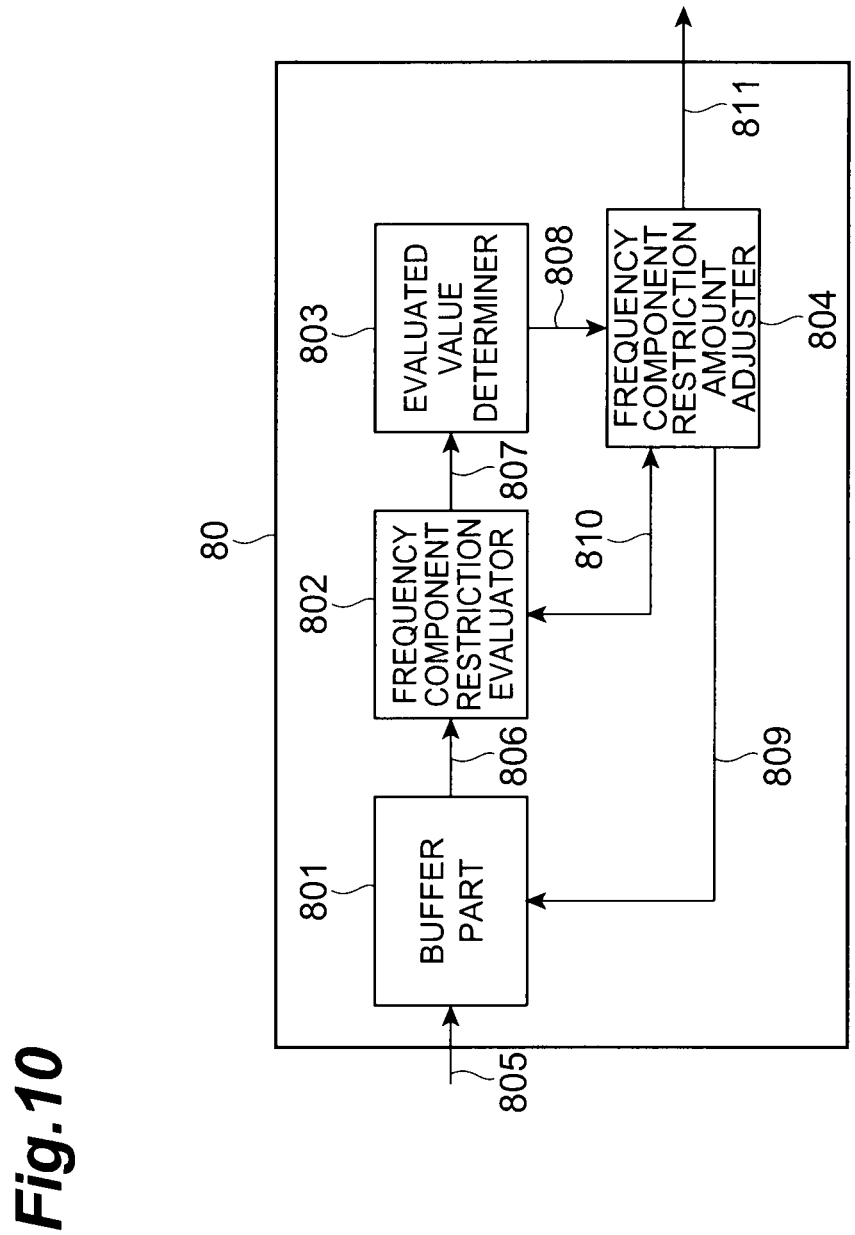
FIG. 10 is a block configuration diagram exemplifying a functional configuration of a video processing apparatus in the third embodiment.

Next, the third embodiment of the present invention will be described. FIG. 10 is a block configuration diagram exemplifying a functional configuration of video processing apparatus 80 in the third embodiment. This video processing apparatus 80 is physically a computer equipped with a CPU (central processing unit), storage devices such as memories, and an input/output device (communication device or the like) for importing or exporting a video. For example, the video processing apparatus 80 is a fixed communication terminal such as a PC terminal, or an information-processable device such as a mobile communication terminal like a cell phone.

The functional configuration of the video processing apparatus 80 will be described with reference to FIG. 10. As shown in FIG. 10, the video processing apparatus 80 is constructed including a buffer part 801, a frequency component restriction evaluator 802, an evaluated value determiner 803, and a frequency component restriction amount adjuster 804 (frequency component adjusting means or frequency component restriction amount adjusting means).

The buffer part 801 is a part that has a memory capable of temporarily saving an input video signal 805 imported as a moving picture signal from the outside and that controls read/write of data from or into the memory, and outputs the input video signal 805 to the frequency component restriction evaluator 802. Hereinafter, the input video signal 806 temporarily saved in the buffer part 801 is fed to the frequency component restriction evaluator 802 in accordance with a reevaluation instruction signal 809.

The frequency component restriction evaluator 802 has functions similar to those of the video evaluation apparatus 50 described in the aforementioned second embodiment. Namely, the frequency component restriction evaluator 802 has the functions similar to the functions of the aforementioned video characteristic analyzer 501, frequency-component-restricted video processor 502 consisting of the frequency component restriction processor 503 and the video characteristic analyzer 504, spatio-temporal characteristic change amount calculator 505, video evaluation determiner 506, and reference characteristic storage 507. The frequency component restriction evaluator 802 calculates the evaluated value 807 through the aforementioned frequency component restriction of spatio-temporal frequency characteristic, based on the input video signal 806 fed from the buffer part 801. A means having the same function as the frequency component restriction processor 503 is assumed to have a function capable of input/output from or to the outside the predetermined frequency component restriction amount B and the information about specific frames (information to specify any two frames) so as to permit the user to set them.

The frequency component restriction evaluator 802 outputs the evaluated value 807 thus calculated, to the evaluated value determiner 803. The means having the same function as the frequency component restriction processor 503 in the frequency component restriction evaluator 802 also outputs the determined frequency component restriction amount B and the specified frame images to the frequency component restriction amount adjuster 804.

The evaluated value determiner 803 determines whether the evaluated value 807 fed from the frequency component restriction evaluator 802 is not less than a rated value. The rated value may be a value preliminarily set, or a value given from the outside. The evaluated value determiner 803 outputs a determination result 808 to the frequency component restriction amount adjuster 804.

The frequency component restriction amount adjuster 804 is a part that receives the determination result 808 fed from the evaluated value determiner 803 and that adjusts the frequency component restriction amount for the input video signal 806 fed from the buffer part 801. It also stores the magnitude of the frequency component restriction amount B and the information about the specified frame images (information to specify any two frame images) received from the frequency component restriction evaluator 802. When the determination result 808 is not less than the rated value, the frequency component restriction amount adjuster 804 performs such adjustment as to increase the frequency component restriction amount B and the N value being the number of frame images between two frame images, based on the frequency component restriction amount B and the information about the frame images stored. Then the frequency component restriction amount adjuster 804 outputs the frequency component restriction amount Bn and the information about the specified frames thus adjusted (signal 810) to the frequency component restriction evaluator 802. At the same time, the frequency component restriction amount adjuster 804 outputs a reevaluation instruction signal 809 to the buffer part 801.

The present embodiment involved the adjustment of both the magnitude of the frequency component restriction amount B and the N value, but it is also possible to adjust at least one of the magnitude of the frequency component restriction amount B and the information of the specified frame images, based on the magnitude of the frequency component restriction amount B and the information of the specified frame images received by the frequency component restriction evaluator 802.

The present embodiment involved the adjustment to increase the frequency component restriction amount B, but the adjustment may also be carried out so as to make the frequency component restriction amount Bn smaller than the frequency component restriction amount B. Similarly, the adjustment may also be carried out so as to decrease the N value.

The frequency component restriction amount adjuster 804 receives the determination result 808 from the evaluated value determiner 803 and performs the adjustment of the magnitude of the frequency component restriction amount B in the frequency component restriction and the number of frame images N as processed objects before the determination result 808 becomes not more than the rated value. When the determination result 808 becomes smaller than the rated value, the frequency component restriction amount adjuster 804 terminates the adjustment of the magnitude of the frequency component restriction amount B and the number of frame images N as processed objects.

The present embodiment showed the example in which the adjustment was terminated when the determination result 808 became not more than the rated value, but the apparatus may adopt any other standard for termination of the adjustment. For example, it is also possible to adopt any method for setting of termination except for the evaluated value, e.g., a method of terminating the adjustment when the magnitude of the frequency component restriction amount B becomes not less than a rated value, or a method of terminating the adjustment when the number of adjustments exceeds a certain number.

When the frequency component restriction amount adjuster 804 terminates the adjustment of the magnitude of the frequency component restriction amount B and the number of frame images N as processed objects, it outputs the magnitude of the frequency component restriction amount Bn and the information of specified frame images thus adjusted, as an adjustment result 811.

The present embodiment involved outputting the magnitude of the frequency component restriction amount Bn and the information of specified frame images after the adjustment, as the adjustment result 811, but it is also possible to output an arbitrary number of magnitudes of frequency component restriction amounts Bn and information of specified frame images adjusted.

The frequency component restriction evaluator 802 may be constructed as the video evaluation apparatus 10 of the first embodiment. In this case, the frequency component restriction evaluator 802 is able to calculate the evaluated value 807 based on the relative relation between the spatio-temporal frequency characteristic of the video and the spatio-temporal frequency characteristic of human eyes on the basis of the feature quantities 105 fed from the video characteristic analyzer 101 (cf. FIG. 1) and the feature quantities 106 about the spatio-temporal frequency characteristic of human visual features as a standard for the relative evaluation stored in the reference characteristic storage 103 (cf. FIG. 1), and to output the evaluated value to the evaluated value determiner 803.

Then the evaluated value determiner 803 determines whether the evaluated value 807 received is not less than a rated value. When the evaluated value is not less than the rated value, the evaluated value determiner 803 outputs the determination result as determination result 808 to the frequency component restriction amount adjuster 804. The frequency component restriction amount adjuster 804 receives the determination result 808 fed from the evaluated value determiner 803, adjusts the frequency component restriction amount B for the input video signal 806, and outputs an adjustment instruction to the frequency component restriction evaluator 802 (video evaluation apparatus 10) and to the buffer part 801.

When the frequency component restriction evaluator 802 (video evaluation apparatus 10) receives the adjustment instruction, it selects any two frame images from the input video signal fed from the buffer part 801. Then the frequency component restriction evaluator 802 controls the video characteristic analyzer 101 so as to generate a frequency-component-restricted image in which predetermined frequencies are restricted, for each of N (N: an integer of not less than 1) images between the two frame images selected. This frequency restriction process is the same restriction process using the frequency component restriction amount B in the second embodiment. The video evaluation apparatus 10 of the first embodiment needs to have the function of performing this restriction process. The evaluated value based on the frequency-component-restricted images reevaluated herein and adjusted may be an evaluation for the entire video, or an evaluation for the N frame images between arbitrary two frame images and for the arbitrary two frame images.

Figure 11:
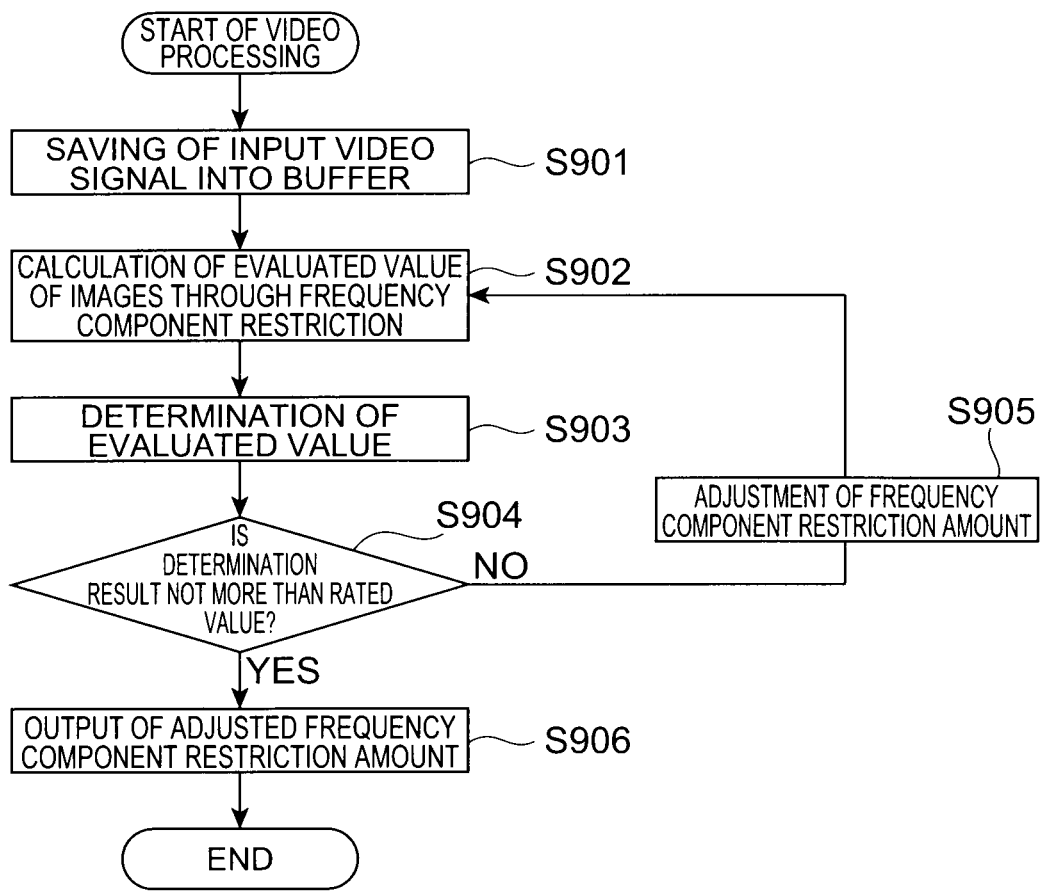
FIG. 11 is a flowchart showing a flow of video processing in the third embodiment.

Next, a flow of video processing in the video processing apparatus 80 of the third embodiment will be described. FIG. 11 is a flowchart showing the video processing of the video processing apparatus 80.

First, the buffer part 801 outputs the input video signal 805 imported as a moving picture signal from the outside, to the frequency component restriction evaluator 802, and temporarily saves the input video signal 805 (step S901).

Next, the frequency component restriction evaluator 802 calculates the evaluated value 807 based on the change amounts of the spatio-temporal frequency characteristic through the frequency component restriction, using the input video signal 805 fed from the buffer part 801 (step S902). Namely, the frequency component restriction evaluator 802 performs the spatio-temporal resolution variable amount determining process (cf. FIG. 9) of the steps from S701 to S707 described in the aforementioned second embodiment, using the input video signal 805, to calculate the evaluated value 807 based on the relative relation between the change amounts of the spatio-temporal frequency characteristic through the frequency component restriction and the human visual features.

Next, the evaluated value determiner 803 determines whether the evaluated value 807 is the predetermined evaluated value, and outputs the determination result to the frequency component restriction amount adjuster 804 (step S903). When the frequency component restriction amount adjuster 804 determines that the determination result 808 is larger than the rated value (S904), it adjusts the frequency component restriction amount and outputs the adjusted frequency component restriction amount and the information of frame images (signal 810) to the frequency component restriction evaluator 802 (step S905).

The frequency component restriction amount adjuster 804 repeats the steps of adjusting the frequency component restriction amount and outputting the adjustment result to the frequency component restriction evaluator 802 (steps S902-S905) until the determination result 808 is received as the determination result 808 smaller than the rated value.

The frequency component restriction amount adjuster 804 terminates the adjustment when the determination result 808 is determined to be smaller than the rated value. The frequency component restriction amount adjuster 804 outputs the magnitude of the adjusted frequency component restriction amount Bn and the information of specified frame images, as the adjustment result 811 (step S906).

When the frequency component restriction evaluator 802 is constructed as the video evaluation apparatus 10 of the first embodiment, the frequency component restriction evaluator 802 is arranged to perform the following steps repeatedly as S902-S905: it selects any two frame images from the fed input video signal and calculates the evaluated value D for N frame images between the selected frame images before the evaluated value D becomes not more than the rated value. In this case, the control is performed so as to decrease N.

As described above, the video processing apparatus 80 in the third embodiment is able to create the frequency-component-restricted video, which is created by performing the process of restricting the subset of signal frequency components, for frame images in the input video. Then the video processing apparatus 80 calculates the feature quantities about the spatio-temporal frequency characteristics of the partially frequency-component-restricted video and the input video. The video processing apparatus 80 compares the change amounts of the feature quantities calculated, with the feature quantities about the spatio-temporal frequency characteristic of the human visual features, to calculate the evaluated value based on the relative relation between the change amounts of the spatio-temporal frequency characteristics through the frequency component restriction on the input video and the spatio-temporal frequency characteristic of human eyes (the reference values corresponding to the change amounts). The video processing apparatus 80 performs the determination on the calculated evaluated value, adjusts the frequency component restriction amount, depending upon the determination result, and outputs the adjusted frequency component restriction amount.

In this manner, the video processing apparatus 80 is able to compare the relative value taking account of the effect on human eyes, based on the change amounts of the spatio-temporal frequency characteristic through the frequency component restriction on the input video, with the rated value to determine the frequency component restriction amount to keep it not less than the rated value.

The above-described video processing apparatus 80 is applicable, for example, to video acquisition apparatus (e.g., cameras), video transmission apparatus, video coding apparatus, or video decoding apparatus.

Fourth Embodiment

Figure 12:
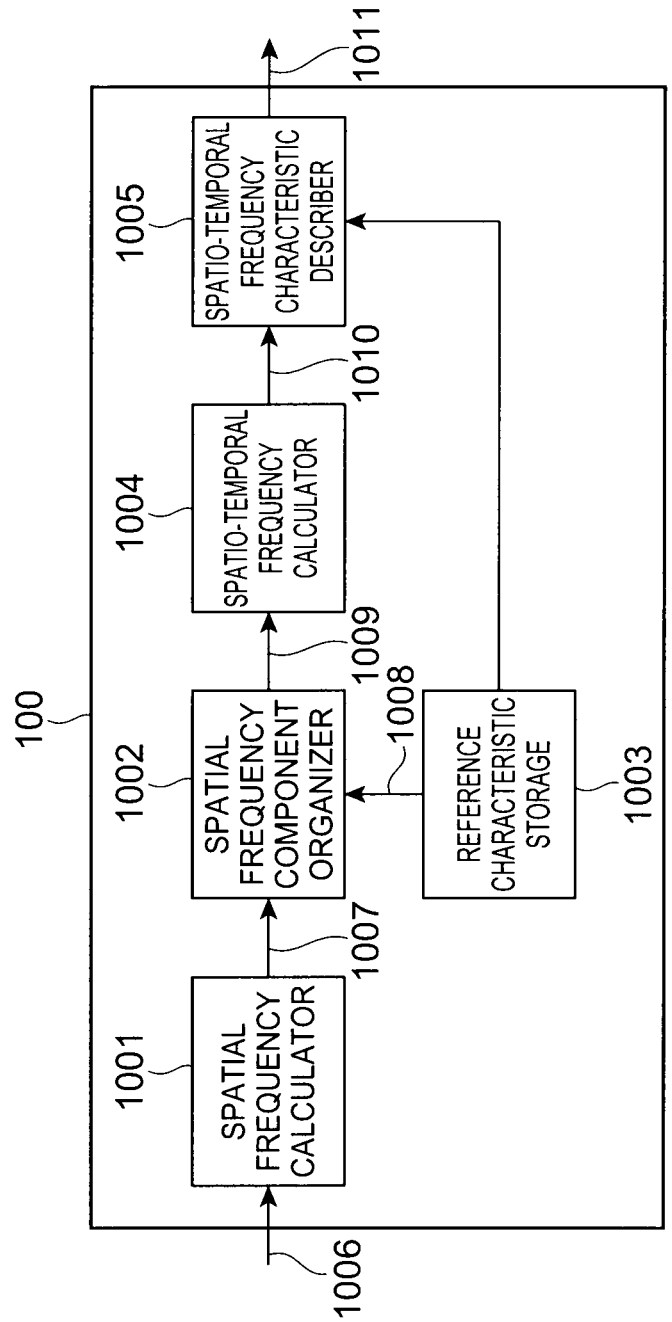
FIG. 12 is a block configuration diagram exemplifying a functional configuration of a spatio-temporal frequency characteristic analyzing apparatus in the fourth embodiment.

Next, the fourth embodiment of the present invention will be described. A spatio-temporal frequency characteristic analyzing apparatus 100 in the fourth embodiment is equivalent to the video characteristic analyzer 101 of the video evaluation apparatus 10 in the first embodiment, the video characteristic analyzer 501 of the video evaluation apparatus 50 in the second embodiment, or the video characteristic analyzer 504. FIG. 12 is a block configuration diagram exemplifying a functional configuration of the spatio-temporal frequency characteristic analyzing apparatus 100 in the fourth embodiment. This spatio-temporal frequency characteristic analyzing apparatus 100 is physically a computer equipped with a CPU (central processing unit), storage devices such as memories, and an input/output device (communication device or the like) for importing or exporting a video. For example, the spatio-temporal frequency characteristic analyzing apparatus 100 is a fixed communication terminal such as a PC terminal, or an information-processable device such as a mobile communication terminal like a cell phone.

The functional configuration of the spatio-temporal frequency characteristic analyzing apparatus 100 will be described with reference to FIG. 12. As shown in FIG. 12, the spatio-temporal frequency characteristic analyzing apparatus 100 is constructed including a spatial frequency calculator 1001 (spatial frequency calculating means), a spatial frequency component organizer 1002 (spatial frequency component organizing means), a reference characteristic storage 1003, a spatio-temporal frequency calculator 1004 (spatio-temporal frequency calculating means), and a spatio-temporal frequency characteristic describer 1005 (characteristic operation means). Each of the components will be described below.

The spatio-temporal frequency characteristic analyzing apparatus 100 sequentially reads frames constituting a video (e.g., the frame images shown in FIG. 2) and stores them into a storage part (not shown).

The spatial frequency calculator 1001 is a part that retrieves stored frame images and calculates magnitudes of spatial frequency amplitudes of spatial frequencies in the frame images. Specifically, first, the spatial frequency calculator 1001 performs the discrete Fourier transform on all the pixels in each frame image to effect a transformation from the pixel space into the frequency space. In the present embodiment the spatial frequency calculator 1001 performs the two-dimensional discrete Fourier transform on the frame image to transform the frame image into a data format having the spatial frequency domain. The spatial frequency calculator 1001 further calculates amplitudes of spatial frequency components obtained by the Fourier transform, based on the Fourier coefficients obtained by the transformation. Specifically, it effects the two-dimensional Fourier transform on a target image to generate a frequency coefficient matrix, and calculates a square root of a power spectrum of energy levels of coefficients in the frequency coefficient matrix. Namely, the spatial frequency calculator 1001 calculates a square root of a sum of squares of real parts and imaginary parts of the respective Fourier coefficients, as a magnitude of a spatial frequency amplitude of each spatial frequency. The spatial frequency calculator 1001 feeds the amplitudes of the spatial frequency components thus calculated, to the spatial frequency component organizer 1002.

When the spatio-temporal frequency characteristic analyzing apparatus 100 is constructed as the video characteristic analyzer 504, the spatial frequency calculator 1001 imports a frequency-component-restricted video obtained by restricting a subset of frequency components in target images, and calculates amplitudes of spatial frequency components on the basis thereof.

The method of describing the spatial frequency amplitudes is not limited to this example, but may be any other description method. The present embodiment involved performing the Fourier transform to calculate the amplitudes of the spatial frequency components, but the method of utilizing the spatial frequency components is not limited to this. For example, it is also possible to calculate phases and to use both the amplitudes and phases.

The present embodiment showed the example of performing the discrete Fourier transform for the entire frame image in the calculation of spatial frequencies, but the image may be transformed into the frequency domain through a plurality of operations, using the one-dimensional discrete Fourier transform in each of directions of the image. The method of frequency transformation is not limited to the discrete Fourier transform, but the transformation may be performed using the discrete cosine transform, the discrete wavelet transform, or the like.

The spatial frequency component organizer 1002 retrieves the amplitudes 1007 of the spatial frequency components calculated in the spatial frequency calculator 1001, in order from the lowest band component toward the highest band component of the spatial frequencies, to convert them into a one-dimensional data string, thereby organizing the spatial frequency components. Specifically, the spatial frequency component organizer 1002 sequentially reads the amplitudes of the spatial frequency components obtained by the two-dimensional Fourier transform, by zigzag scan or in a preset sequence from the DC component to the last without return to any frequency component (i.e., one string) to convert them into one-dimensional data.

The present embodiment adopted the transformation of the amplitudes of the spatial frequency components into the one-dimensional data, but the amplitudes may be organized in the original two-dimensional form.

The present embodiment involved organizing the spatial frequency components by use of a subset of amplitudes of the spatial frequency components, but any spatial frequency components may be organized as long as they are at least a subset of frequency components out of the spatial frequency components. For example, all the amplitudes of the spatial frequency components may be organized, or only frequency components corresponding to the reference characteristic stored in the reference characteristic storage 1003 may be organized.

On the occasion of reading the amplitudes in the preset sequence, it is desirable to adopt a sequence in correspondence to the reference characteristic stored in the reference characteristic storage 1003. The method of organizing the amplitudes of the spatial frequencies is not limited to this.

The spatial frequency component organizer 1002 accumulates the amplitudes of the spatial frequency components thus organized, by the number of frames equal to the frame rate of the video. For convenience' sake of description, the frame rate of the video is set to 30. The spatial frequency component organizer 1002 converts the one-dimensional data of amplitudes of spatial frequency components in 30 frames, into two-dimensional data 1009. Namely, it arranges the one-dimensional data each of which is composed of one row, in the column direction so that the corresponding spatial frequency components of the one-dimensional data are arranged in the same columns, thereby organizing the data to obtain the two-dimensional data 1009. The spatial frequency component organizer 1002 feeds the two-dimensional data thus organized, to the spatio-temporal frequency calculator 1004.

In the present embodiment the data is accumulated by the number of frames equal to the frame rate of the video, whereby the unit of temporal frequencies can be matched with the unit of the frame rate. However, the number of frames to be accumulated is not limited to this example equal to the frame rate of the video.

The spatio-temporal frequency calculator 1004 performs the one-dimensional Fourier transform of the organized two-dimensional data for columns each representing a change in the time direction of a spatial frequency component, to calculate amplitudes 1010 of spatio-temporal frequencies. Specifically, the spatio-temporal frequency calculator 1004 sequentially performs the Fourier transform for thirty amplitude data of the respective spatial frequency components to calculate the amplitudes of the spatio-temporal frequency components by use of transformed Fourier coefficients. Namely, in order to calculate a square root of a power spectrum of energy levels of one-dimensional Fourier coefficients of the respective spatial frequency components, a square root of a sum of squares of real parts and imaginary parts of the respective Fourier coefficients is calculated as a magnitude of a spatial frequency amplitude of each spatial frequency. The description method of the amplitudes of spatial frequencies is not limited to this, but may be any other description method.

Then the spatio-temporal frequency calculator 1004 feeds the amplitudes 1010 of the spatio-temporal frequencies thus calculated, to the spatio-temporal frequency characteristic describer 1005.

The present embodiment showed the example of performing the Fourier transform for the data strings of all the spatial frequency components, but the Fourier transform may be performed for amplitude data of at least a subset of spatial frequency components. The present embodiment involved calculating the temporal frequencies by use of the one-dimensional Fourier transform, but the spatio-temporal frequencies may be calculated by use of the two-dimensional Fourier transform.

The present embodiment involved calculating the amplitudes of the spatial frequency components by the Fourier transform, but the method of utilizing the spatial frequency components is not limited to this. For example, it is also possible to calculate phases and to use both the amplitudes and phases.

The method of frequency transformation is not limited to the discrete Fourier transform, but the transformation may be performed using the discrete cosine transform, the discrete wavelet transform, or the like.

The spatio-temporal frequency characteristic describer 1005 extracts amplitudes of specific frequency components out of the temporal frequencies calculated by the spatio-temporal frequency calculator 1004. Specifically, the spatio-temporal frequency characteristic describer 1005 extracts a magnitude P1 of a specific temporal frequency y [Hz] in a spatially high band x [Hz] and a magnitude P2 of a component of a specific temporal frequency v [Hz] in a spatially low band z [Hz]. A spatio-temporal frequency characteristic F of the video is described according to the following mathematical expression using P1 and P2 thus extracted.
Spatio-temporal frequency characteristic F $$J(P1,P2)=k1*P1+k2*P2 \tag{11}$$

In the equation, k1 and k2 are weighting factors for P1 and P2, respectively.

The specific frequencies x, y, z, and v of the spatio-temporal frequencies presented in the present embodiment are preferably those based on the reference characteristic in the reference characteristic storage 1003. It is also possible to use predetermined coefficients x, y, z, and v.

The present embodiment involved setting the specific spatial frequencies and temporal frequencies, but a bandwidth may be set for each of the frequencies. In that case, it is also possible to extract a magnitude of a spatio-temporal frequency component using a maximum, a minimum, or an average of magnitudes of spatio-temporal frequencies included in the bandwidth of each frequency thus set.

The present embodiment showed the example of extracting the amplitudes of two frequency components, but the spatio-temporal frequency characteristic F may be described by use of magnitudes of amplitudes of at least a high-frequency component and a low-frequency component. The present embodiment used the high-frequency component and the low-frequency component, but the spatio-temporal frequency characteristic F may be described by use of intermediate frequency components. The spatio-temporal frequency characteristic F was calculated by the weighted operation of P1 and P2, but the spatio-temporal frequency characteristic F may be determined by any operation as long as it is an operation using P1 and P2.

Figure 13:
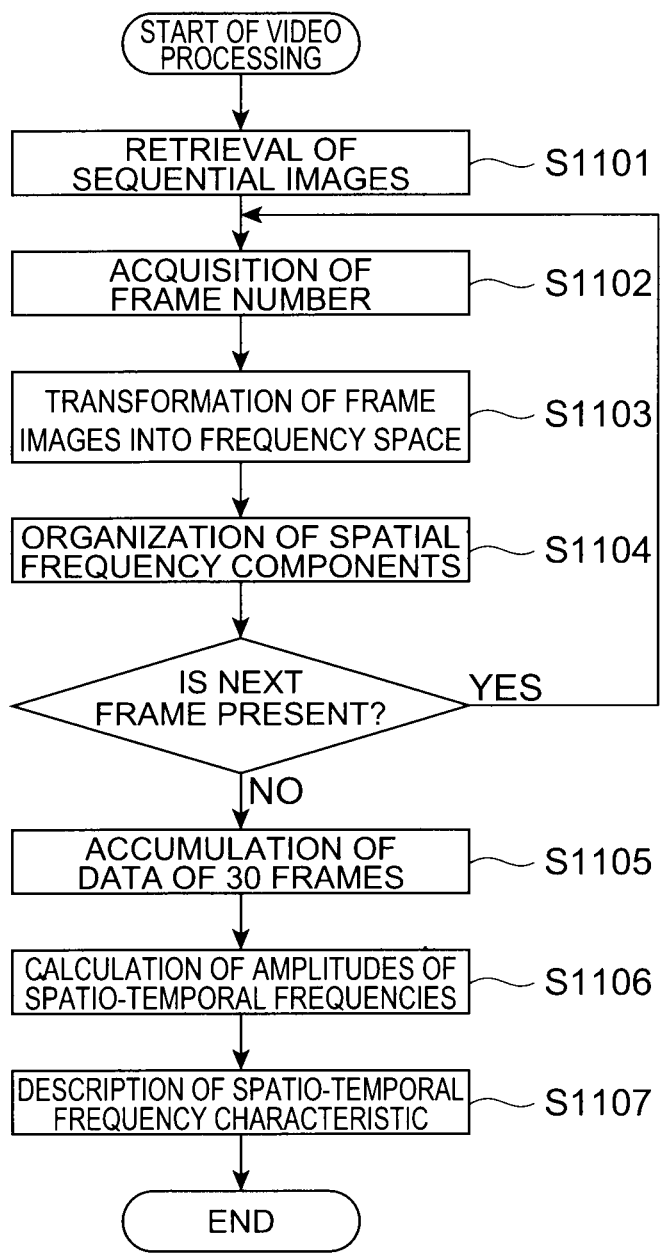
FIG. 13 is a flowchart showing a video evaluation process of the spatio-temporal frequency characteristic analyzing apparatus in the fourth embodiment.

Next, the video evaluation process in the spatio-temporal frequency characteristic analyzing apparatus 100 of the fourth embodiment will be described. FIG. 13 is a flowchart showing the video evaluation process of the spatio-temporal frequency characteristic analyzing apparatus 100.

The spatial frequency calculator 1001 retrieves the input video signal 1006 of sequential image data (step S1101). Next, the spatial frequency calculator 1001 acquires the frame number (S1102), and converts the input video signal 1006 of the frame image into amplitudes 1007 of spatial frequencies of the video (step S1003).

Next, the spatial frequency component organizer 1002 converts the amplitudes 1007 of spatial frequencies into one-dimensional data to organize the data (step S1104), and accumulates spatial frequency data, for example, of 30 frames to generate two-dimensional data 1009 (step S1105).

Next, the spatio-temporal frequency calculator 1004 sequentially performs the one-dimensional Fourier transform for columns indicating temporal changes of the respective spatial frequencies in the two-dimensional data 1009, to obtain the amplitudes of the transformed Fourier transform coefficients, thereby calculating the amplitudes 1010 of the spatio-temporal frequencies (step S1106).

Then the spatio-temporal frequency characteristic describer 1005 extracts at least one specific frequency component among the amplitudes 1010 of the spatio-temporal frequencies to describe the spatio-temporal frequency characteristic 1011 of the video (step S1107).

As described above, the spatio-temporal frequency characteristic analyzing apparatus 100 in the fourth embodiment is able to describe the spatio-temporal frequency characteristic matched with the reference characteristic by the description with the organization suited to the reference characteristic of the spatio-temporal frequency components, for the frame images in the input video. The spatio-temporal frequency characteristic analyzing apparatus 100 is able to describe the spatio-temporal frequency characteristic of the video taking account of the effect on human eyes by setting the reference characteristic equal to a human visual characteristic.

Fifth Embodiment

With respect to the video evaluation apparatus 10, 50 and the video processing apparatus 80 and the spatio-temporal frequency characteristic analyzing apparatus 100 in the first embodiment to the fourth embodiment above, equivalent functions can be substantialized by programs. Specifically, a program is recorded in a recording medium (e.g., a flexible disk, a CD-ROM, a DVD, or the like), it is read into a computer composed of a CPU, a RAM, a ROM, an auxiliary storage, and so on, and thereby the computer becomes able to substantialize the functions equivalent to the video evaluation apparatus 10, 50, the video processing apparatus 80, and the spatio-temporal frequency characteristic analyzing apparatus 100. These programs will be described below.

Figure 14:
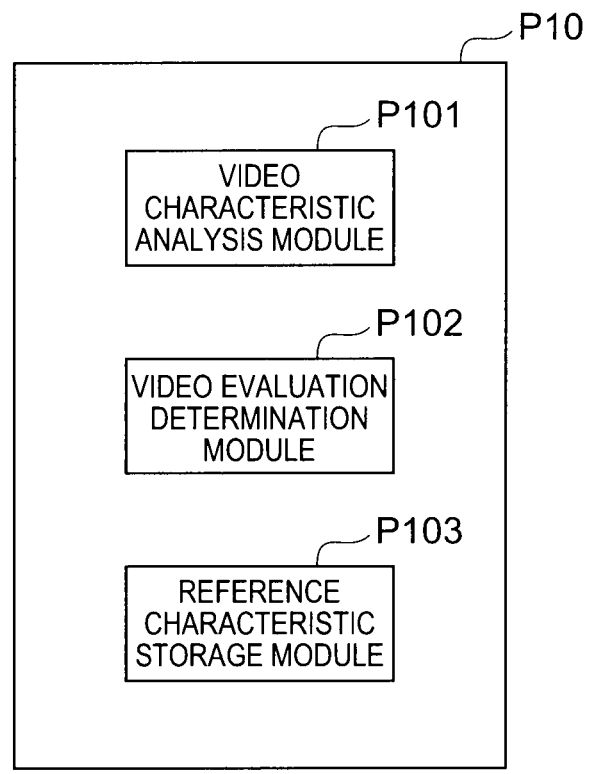
FIG. 14 is a module configuration diagram of program P10 capable of implementing functions equivalent to those of video evaluation apparatus 10.

First, a program capable of substantializing the functions equivalent to the video evaluation apparatus 10 will be described. FIG. 14 is a module configuration diagram of program P10 capable of substantializing the functions equivalent to the video evaluation apparatus 10. The program P10 is configured including a video characteristic analysis module P101, a video evaluation determination module P102, and a reference characteristic storage module P103.

The functions implemented with execution of each of these modules are much the same as those of the respective components of the video evaluation apparatus 10. Namely, the aforementioned modules are able to substantialize the functions equivalent to those of the components, corresponding to the video characteristic analyzer 101, the video evaluation determiner 102, and the reference characteristic storage 103.

Figure 15:
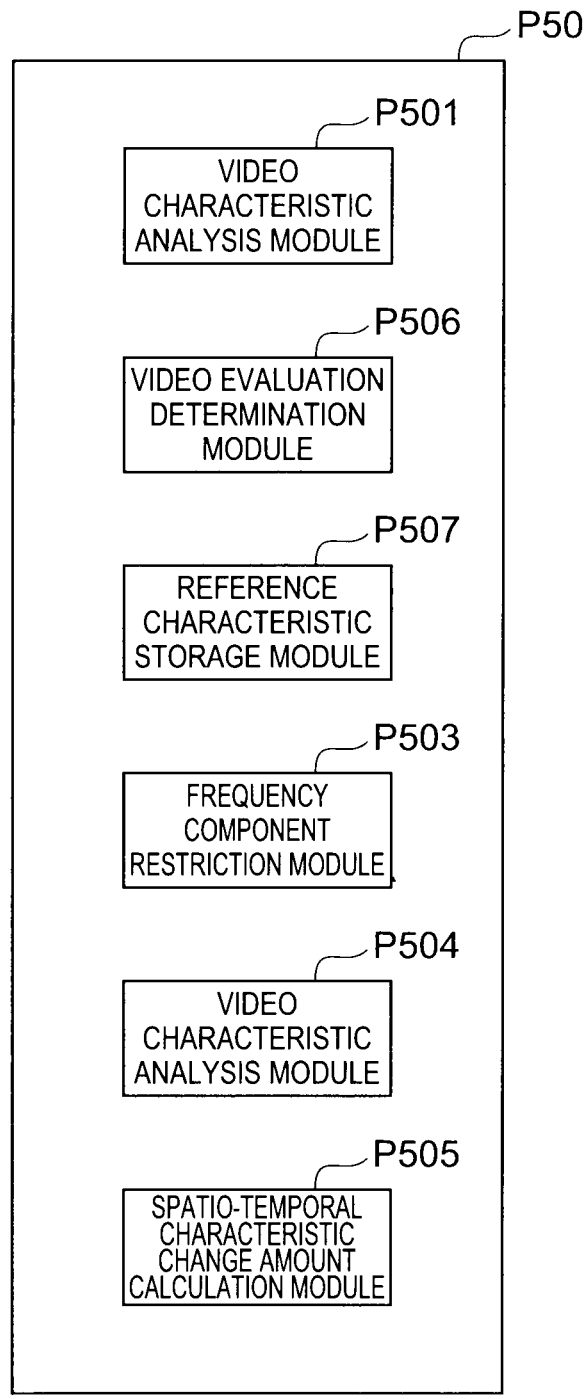
FIG. 15 is a module configuration diagram of program P50 capable of implementing functions equivalent to those of video evaluation apparatus 50.

Next, a program capable of substantializing the functions equivalent to the video evaluation apparatus 50 will be described. FIG. 15 is a module configuration diagram of program P50 capable of substantializing the functions equivalent to the video evaluation apparatus 50. The program P50 is configured including a video characteristic analysis module P501, a frequency component restriction module P503, a video characteristic analysis module P504, a spatio-temporal characteristic change amount calculation module P505, a video evaluation determination module P506, and a reference characteristic storage module P507.

The functions implemented with execution of each of these modules are much the same as the functions of the respective components of the video evaluation apparatus 50. Namely, the aforementioned modules are able to substantialize the functions equivalent to those of the respective components, corresponding to the video characteristic analyzer 501, the frequency-component-restricted video processor 502 (frequency component restriction processor 503 and video characteristic analyzer 504), the spatio-temporal characteristic change amount calculator 505, the video evaluation determiner 506, and the reference characteristic storage 507.

Figure 16:
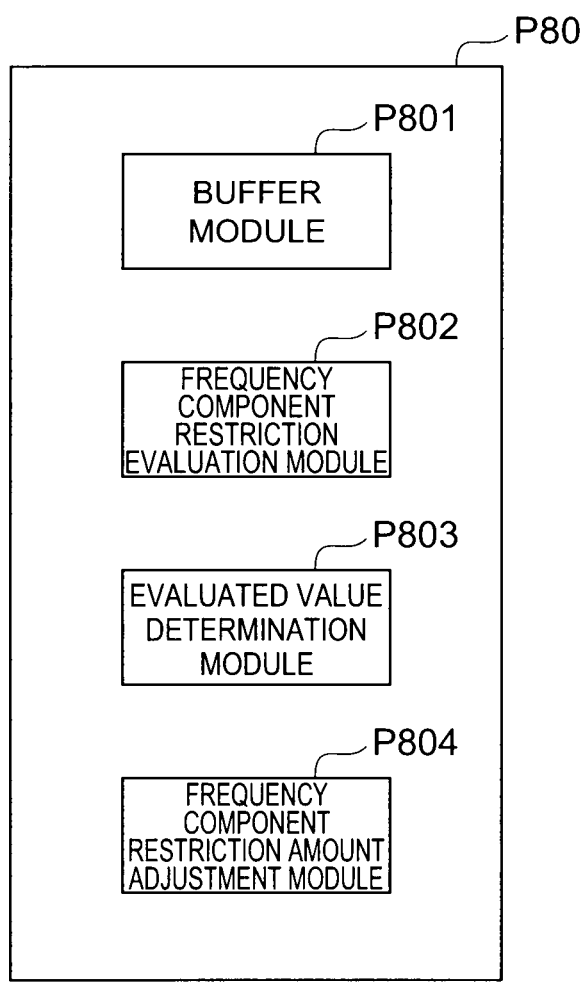
FIG. 16 is a module configuration diagram of program P80 capable of implementing functions equivalent to those of video processing apparatus 80.

Next, a program capable of substantializing functions equivalent to the video processing apparatus 80 will be described. FIG. 16 is a module configuration diagram of program P80 capable of substantializing the functions equivalent to the video processing apparatus 80. The program P80 is configured including a buffer module P801, a frequency component restriction evaluation module P802, an evaluated value determination module P803, and a frequency component restriction amount adjustment module P804. The frequency component restriction evaluation module P802 is a module equivalent to the video evaluation program P10 or P50.

The functions substantialized with execution of each of these modules are much the same as those of the respective components of the video processing apparatus 80. Namely, the foregoing modules are able to substantialize the functions equivalent to those of the respective components, corresponding to the buffer part 801, the frequency component restriction evaluator 802, the evaluated value determiner 803, and the frequency component restriction amount adjuster 804.

Figure 17:
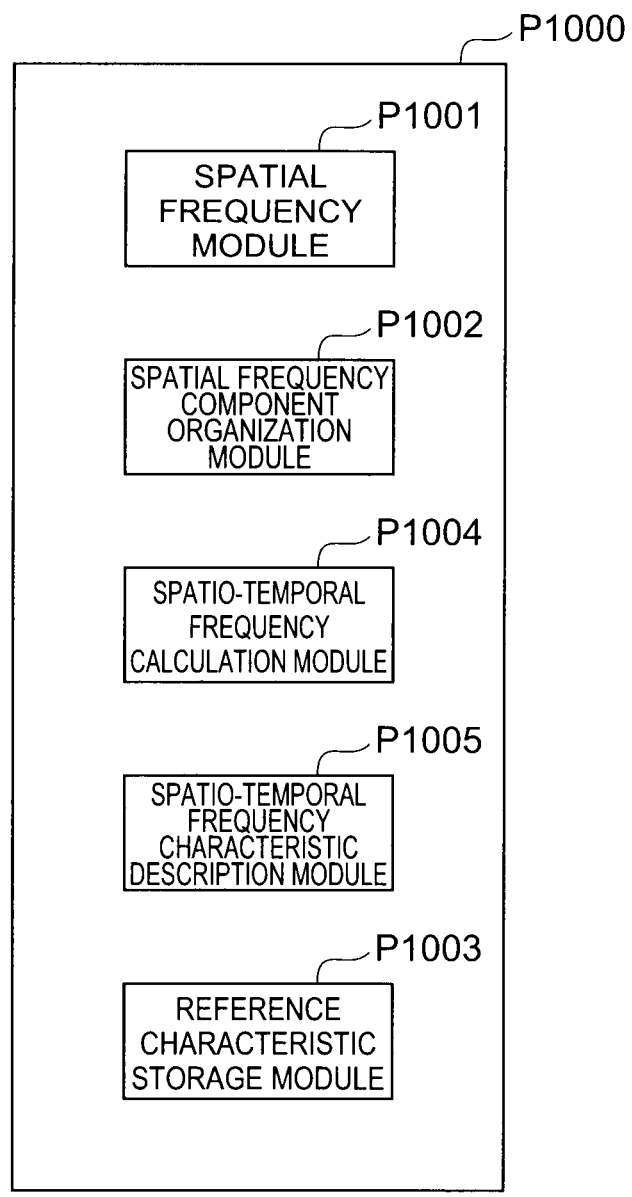
FIG. 17 is a module configuration diagram of program P1000 capable of implementing functions equivalent to those of spatio-temporal frequency characteristic analyzing apparatus 100.

Next, a program capable of substantializing the functions equivalent to the spatio-temporal frequency characteristic analyzing apparatus 100 will be described. FIG. 17 is a module configuration diagram of program P1000 capable of substantializing the functions equivalent to the spatio-temporal frequency characteristic analyzing apparatus 100. The program P1000 is configured including a spatial frequency module P1001, a spatial frequency component organization module P1002, a reference characteristic storage module P1003, a spatio-temporal frequency calculation module P1004, and a spatio-temporal frequency characteristic description module P1005.

The functions substantialized with execution of each of these modules are much the same as those of the respective components of the spatio-temporal frequency characteristic analyzing apparatus 100. Namely, the foregoing modules are able to substantialize the functions equivalent to those of the respective components, corresponding to the spatial frequency calculator 1001, the spatial frequency component organizer 1002, the reference characteristic storage 1003, the spatio-temporal frequency calculator 1004, and the spatio-temporal frequency characteristic describer 1005.

Next, the operational effects of the video evaluation apparatus 10, video evaluation apparatus 50, and video processing apparatus 80 in the embodiments of the present invention will be described. The video evaluation apparatus 10 is arranged to store the reference characteristic, which is the predetermined spatio-temporal frequency characteristic about the video, in the reference characteristic storage 103. In the video evaluation apparatus 10 the video characteristic analyzer 101 then imports a target video consisting of a plurality of images, and calculates the spatio-temporal frequency characteristic of the target video. The video evaluation determiner 102 determines the evaluated value of the input target video, based on the relative relation between the calculated spatio-temporal frequency characteristic and the reference characteristic. This enables the evaluation based on the characteristic of the video consisting of sequential images, and the appropriate evaluation of the video, as compared with the evaluation of one image in the video. Therefore, even if each image in the video has a low evaluation because of a low resolution, the video can have a high evaluation to be appropriately evaluated as a video.

The video characteristic analyzer 101 of this video evaluation apparatus 10 is provided with the spatial frequency calculator 1001, the spatial frequency component organizer 1002, the reference characteristic storage 1003, the spatio-temporal frequency calculator 1004, and the spatio-temporal frequency characteristic describer 1005 and is able to perform the following operation. Namely, the spatial frequency calculator 1001 calculates spatial frequencies of a plurality of images, and the spatial frequency component organizer 1002 converts the components of the spatial frequencies thus calculated, into data associated with the reference characteristic stored in the reference characteristic storage 1003. Then the spatio-temporal frequency calculator 1004 effects the frequency transformation on a temporal change of at least one spatial frequency component out of the transformed spatial frequency components, to calculate the spatio-temporal frequencies, and the spatio-temporal frequency characteristic describer 1005 is able to perform the operation of data capable of describing the spatio-temporal frequency characteristic of the video using the high-frequency component and low-frequency component out of the spatio-temporal frequencies thus calculated. This enables the appropriate description of the spatio-temporal frequency characteristic of the video, the evaluation based on the characteristic as the video of sequential images, and the appropriate evaluation of the video, as compared with the evaluation of one image in the video.

The frequency component restriction amount adjuster 804 in the video processing apparatus 80 adjusts the predetermined frequency components for N (N: an integer of not less than 1) images between any two images in the target video, based on the evaluated value determined by the frequency component restriction evaluator 802 (equivalent to the video evaluation apparatus 10). Then the frequency component restriction evaluator 802 is able to calculate the evaluated value of the N images adjusted in the signal frequency components. This enables execution of reevaluation for some images adjusted in the frequency components, and evaluation of the video in every frequency component from a variety of aspects.

The video evaluation apparatus 50 stores the reference characteristic being the predetermined spatio-temporal frequency characteristic of the video, in the reference characteristic storage 507. Then the video characteristic analyzer 501 of the video evaluation apparatus 50 imports a target video consisting of a plurality of images, and calculates the first video characteristic based on the spatio-temporal frequency characteristic of the target video. The frequency-component-restricted video processor 502 calculates the second video characteristic based on the spatio-temporal frequency characteristic in a frequency-component-restricted video obtained by restricting a subset of frequency components in the target image. The spatio-temporal characteristic change amount calculator 505 calculates the change amounts of the second video characteristic relative to the first video characteristic, and the video evaluation determiner 506 calculates the evaluated value of the input target video, based on the relative relation between the change amounts and the reference characteristic.

This enables the evaluation of the target video by use of the frequency-component-restricted video obtained by restricting the subset of frequency components, and permits the apparatus to clarify the difference in terms of the frequency components in the images through the frequency component restriction of the spatio-temporal frequency characteristic. Therefore, the frequency components of the video to be evaluated can be appropriately evaluated based on the frequency-component-restricted video. For example, where the frequency-component-restricted video is a video in which the frequency components that can be perceived by human vision are restricted, the evaluation based on the relative relation between the change amounts between the frequency-component-restricted video and the target video, and the reference characteristic permits evaluation of the video about the frequency components that cannot be perceived by human vision.

The video evaluation apparatus 50 is able to obtain the frequency-component-restricted video resulting from the restriction of the subset of frequency components in the N images, from the N (N: an integer of not less than 1) images between any two images in the target video, by the frequency-component-restricted video processor 502. This enables the evaluation of the target video based on the frequency-component-restricted video thus restricted, and the evaluation taking account of the characteristic of the frequency components of the subset of N images in the target video.

The video characteristic analyzer 501 of the video evaluation apparatus 50 is provided with the spatial frequency calculator 1001, the spatial frequency component organizer 1002, the reference characteristic storage 1003, the spatio-temporal frequency calculator 1004, and the spatio-temporal frequency characteristic describer 1005 and is able to perform the following operation. Namely, the spatial frequency calculator 1001 calculates the spatial frequencies of the plurality of images, and the spatial frequency component organizer 1002 converts the components of the spatial frequencies thus calculated, into data associated with the reference characteristic stored in the reference characteristic storage 1003. Then the spatio-temporal frequency calculator 1004 effects the frequency transformation on the temporal change of at least one spatial frequency component out of the transformed spatial frequency components to calculate the spatio-temporal frequencies, and the spatio-temporal frequency characteristic describer 1005 is able to perform the operation of the data capable of describing the spatio-temporal frequency characteristic of the video, using the high-frequency component and low-frequency component out of the calculated spatio-temporal frequencies. This enables the appropriate description of the spatio-temporal frequency characteristic of the video, the evaluation based on the characteristic of the video consisting of sequential images, and the appropriate evaluation of the video, as compared with the evaluation of one image in the video.

The video characteristic analyzer 504 of the video evaluation apparatus 50 is provided with the spatial frequency calculator 1001, spatial frequency component organizer 1002, reference characteristic storage 1003, spatio-temporal frequency calculator 1004, and spatio-temporal frequency characteristic describer 1005, and is able to perform the following operation. Namely, the spatial frequency calculator 1001 calculates the spatial frequencies from the frequency-component-restricted video obtained by restricting the subset of frequency components in the target images, and the spatial frequency component organizer 1002 converts the components of spatial frequencies thus calculated, into the data associated with the reference characteristic stored in the reference characteristic storage 1003. Then the spatio-temporal frequency calculator 1004 effects the frequency transformation on the temporal change of at least one spatial frequency component out of the transformed spatial frequency components to calculate the spatio-temporal frequencies, and the spatio-temporal frequency characteristic describer 1005 is able to perform the operation of data capable of describing the spatio-temporal frequency characteristic of the video, using the high-frequency component and low-frequency component out of the calculated spatio-temporal frequencies. This enables the appropriate description of the spatio-temporal frequency characteristic of the video, the evaluation based on the characteristic of the video consisting of sequential images, and the appropriate evaluation of the video, as compared with the evaluation of one image in the video.

The frequency component restriction amount adjuster 804 of the video processing apparatus 80 is able to adjust the characteristic of restricted frequency components based on the evaluated value, and to perform reevaluation by the characteristic of adjusted frequency components.

The frequency component restriction amount adjuster 804 of the video processing apparatus 80 is able to change arbitrary two images as restricted objects of frequency components on the basis of the evaluated value, and to perform reevaluation based on images after the change of the restricted objects.

These video evaluation apparatus 10, video evaluation apparatus 50, and video processing apparatus 80 are able to perform the evaluation based on the human visual features when the reference characteristic stored in the reference characteristic storage 103 or 507 is set to be the frequency characteristic defined on the basis of the human visual features.

The aforementioned video characteristic analyzer 101, video characteristic analyzer 501, and video characteristic analyzer 504 can be constructed as the spatio-temporal frequency characteristic analyzing apparatus 100, with the following operational effect. Namely, the spatial frequency calculator 1001 calculates the spatial frequencies of the plurality of images, and the spatial frequency component organizer 1002 organizes the components of spatial frequencies thus calculated, based on the transformation into one-dimensional data associated with the predetermined reference characteristic. Then the spatio-temporal frequency calculator 1004 effects the frequency transformation on the temporal change of at least one spatial frequency component out of the transformed and organized spatial frequency components, to calculate the spatio-temporal frequencies, and the spatio-temporal frequency characteristic describer 1005 is able to calculate the frequency characteristic data capable of describing the spatio-temporal frequency characteristic of the video from at least one specific spatio-temporal frequency component, using the high-frequency component and low-frequency component out of the calculated spatio-temporal frequencies. This enables the appropriate description of the spatio-temporal frequency characteristic of the video, the evaluation based on the characteristic of the video consisting of sequential images, and the appropriate evaluation of the video, as compared with the evaluation of one image in the video.

What is claimed is:

1. A video evaluation apparatus comprising:
storing means for storing a reference characteristic which is a predetermined spatio-temporal frequency characteristic about a video;
first video characteristic analyzing means for calculating a first video characteristic based on a spatio-temporal frequency characteristic of a target video consisting of a plurality of images;
second video characteristic analyzing means for calculating a second video characteristic based on a spatio-temporal frequency characteristic of a frequency-component-restricted video obtained by restricting a subset of frequency components in target images; and
video evaluation determining means for calculating an evaluated value of the input target video, based on a relative relation between a change amount of the second video characteristic calculated by the second video characteristic analyzing means, relative to the first video characteristic calculated by the first video characteristic analyzing means, and the reference characteristic stored in the storing means,
wherein the spatio-temporal frequency characteristics can be sensed by human eyes.

2. The video evaluation apparatus according to claim 1, wherein the second video characteristic analyzing means restricts a subset of frequency components in N (N: an integer of not less than 1) images between any two images in the target video to obtain the frequency-component-restricted video.

3. The video evaluation apparatus according to claim 1, comprising frequency component adjusting means for adjusting the frequency components to be restricted by the second video characteristic analyzing means, based on the evaluated value,
wherein the video evaluation determining means calculates an evaluated value of the images the signal frequency components of which were adjusted by the frequency component adjusting means.

4. The video evaluation apparatus according to claim 2, comprising frequency component restriction amount adjusting means for changing said any two images for defining the frequency-component-restricted objects by the second video characteristic analyzing means, based on the evaluated value.

5. The video evaluation apparatus according to claim 1,
wherein the first video characteristic analyzing means is comprised of:
spatial frequency calculating means for calculating spatial frequencies of a plurality of images;
spatial frequency component organizing means for converting components of the spatial frequencies calculated by the spatial frequency calculating means, into data associated with a predetermined reference;
spatio-temporal frequency calculating means for effecting a frequency transformation on a temporal change of at least one spatial frequency component out of the spatial frequency components converted by the spatial frequency component organizing means, to calculate spatio-temporal frequencies; and
characteristic calculating means for calculating data capable of describing the spatio-temporal frequency characteristic of the video, using a high-frequency component and a low-frequency component out of the spatio-temporal frequencies calculated by the spatio-temporal frequency calculating means.

6. The video evaluation apparatus according to claim 1,
wherein the second video characteristic analyzing means is comprised of:
spatial frequency calculating means for calculating spatial frequencies from the frequency-component-restricted video obtained by restricting the subset of frequency components in the target images;
spatial frequency component organizing means for converting components of the spatial frequencies calculated by the spatial frequency calculating means, into data associated with a predetermined reference;
spatio-temporal frequency calculating means for effecting a frequency transformation on a temporal change of at least one spatial frequency component out of the spatial frequency components converted by the spatial frequency component organizing means, to calculate spatio-temporal frequencies; and
characteristic calculating means for calculating data capable of describing the spatio-temporal frequency characteristic of the video, using a high-frequency component and a low-frequency component out of the spatio-temporal frequencies calculated by the spatio-temporal frequency calculating means.

7. The video evaluation apparatus according to claim 1, wherein the reference characteristic is a frequency characteristic defined based on a human visual characteristic.

8. A video evaluation method comprising:
a first video characteristic analyzing step of calculating a first video characteristic based on a spatio-temporal frequency characteristic of a target video consisting of a plurality of images;
a second video characteristic analyzing step of calculating a second video characteristic based on a spatio-temporal frequency characteristic of a frequency-component-restricted video obtained by restricting a subset of frequency components in target images; and
a video evaluation determining step of calculating an evaluated value of the input target video, based on a relative relation between a change amount of the second video characteristic relative to the first video characteristic, and a reference characteristic which is a predetermined spatio-temporal frequency characteristic about the video,
wherein the spatio-temporal frequency characteristic can be sensed by human eyes.

9. A non-transitory computer-readable medium including a computer program, which when executed by a computer, causes the computer to perform a method comprising:
- storing a reference characteristic which is a predetermined spatio-temporal frequency characteristic about a video;
- calculating a first video characteristic based on a spatio-temporal frequency characteristic of a target video consisting of a plurality of images;
- calculating a second video characteristic based on a spatio-temporal frequency characteristic of a frequency-component-restricted video obtained by restricting a subset of frequency components in target images; and
- calculating an evaluated value of the input target video based on a relative relation between a change amount of the second video characteristic relative to the first video characteristic and the reference characteristic stored in the storing module
- wherein the spatio-temporal frequency characteristic can be sensed by human eyes.

* * * * *